United States Patent
Kim et al.

(10) Patent No.: US 11,632,817 B2
(45) Date of Patent: Apr. 18, 2023

(54) METHOD AND DEVICE FOR TRANSMITTING INFORMATION FOR OPERATING STATION IN WIRELESS LOCAL AREA NETWORK SYSTEM SUPPORTING MULTIPLE BANDS

(71) Applicant: LG ELECTRONICS INC., Seoul (KR)

(72) Inventors: Suhwook Kim, Seoul (KR); Sanggook Kim, Seoul (KR); Jeongki Kim, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 127 days.

(21) Appl. No.: 17/267,658

(22) PCT Filed: Aug. 8, 2019

(86) PCT No.: PCT/KR2019/010000
§ 371 (c)(1),
(2) Date: Feb. 10, 2021

(87) PCT Pub. No.: WO2020/032639
PCT Pub. Date: Feb. 13, 2020

(65) Prior Publication Data
US 2021/0329721 A1    Oct. 21, 2021

(30) Foreign Application Priority Data

Aug. 10, 2018  (KR) .................. 10-2018-0094062
Jun. 27, 2019  (KR) .................. 10-2019-0077343

(51) Int. Cl.
*H04W 76/15*    (2018.01)
*H04W 84/12*    (2009.01)

(52) U.S. Cl.
CPC ............ *H04W 76/15* (2018.02); *H04W 84/12* (2013.01)

(58) Field of Classification Search
CPC ............................ H04W 76/15; H04W 84/12
See application file for complete search history.

(56) References Cited

U.S. PATENT DOCUMENTS

2015/0288599 A1   10/2015  Zhou et al.
2017/0366329 A1   12/2017  Cao et al.
2018/0206284 A1*   7/2018  Zhou .................... H04B 1/1615

FOREIGN PATENT DOCUMENTS

EP         3609209 A1 *  2/2020  ............ H04W 74/08
KR   10-2014-0088318      7/2014

OTHER PUBLICATIONS

PCT International Application No. PCT/KR2019/010000, International Search Report dated Nov. 14, 2019, 4 pages.
(Continued)

*Primary Examiner* — Charles C Jiang
*Assistant Examiner* — Voster Preval
(74) *Attorney, Agent, or Firm* — Lee Hong Degerman Kang Waimey

(57) ABSTRACT

The present disclosure relates to a method and/or device for receiving a signal in a wireless local area network (WLAN) system. A station (STA) of the present disclosure may aggregate a plurality of links including a first link and a second link. The STA of the present disclosure may transmit a frame including first information related to a preferred link and second information related to whether signal sharing is possible in the plurality of links. Information transmitted by the STA of the present disclosure may be used to appropriately signal an operating band in the WLAN system supporting a plurality of links.

9 Claims, 32 Drawing Sheets

(56) References Cited

OTHER PUBLICATIONS

Sun et al., "EDMG Capability and Operation Element Channel Indication", IEEE P802.11 Wireless LANs, IEEE 802.11-yy/xxxxr0, Mar. 2017, 6 pages.

* cited by examiner

FIG. 3

| Channel | F₀ (MHz) | North America | Japan | Most of world |
|---|---|---|---|---|
| 1 | 2412 | Yes | Yes | Yes |
| 2 | 2417 | Yes | Yes | Yes |
| 3 | 2422 | Yes | Yes | Yes |
| 4 | 2427 | Yes | Yes | Yes |
| 5 | 2432 | Yes | Yes | Yes |
| 6 | 2437 | Yes | Yes | Yes |
| 7 | 2442 | Yes | Yes | Yes |
| 8 | 2447 | Yes | Yes | Yes |
| 9 | 2452 | Yes | Yes | Yes |
| 10 | 2457 | Yes | Yes | Yes |
| 11 | 2462 | Yes | Yes | Yes |
| 12 | 2467 | No except CAN | Yes | Yes |
| 13 | 2472 | Yes | Yes | Yes |
| 14 | 2484 | Yes | 11b Only | No |

FIG. 27

| Element ID (2710) | Length (2720) | Multi-band Control (2760) | Band ID (2730) | Operating Class (2740) | Channel Number (2750) | BSSID (2770) | Beacon Interval (2780) |
|---|---|---|---|---|---|---|---|
| 1 | 1 | 1 | 1 | 1 | 1 | 6 | 2 |

Octets:

| TSF Offset | Multi-band Connection Capability | FSTSession TimeOut | STA MAC Address (optional) | Pairwise Cipher Suite Count (optional) | Pairwise Cipher Suite List (optional) |
|---|---|---|---|---|---|
| 8 | 1 | 1 | 0 or 6 | 0 or 2 | 4 × m |

Octets:

FIG. 28

| Preferred link/band (2810) | Sharing Capability (2820) |
|---|---|
| N | N |

Bits :

METHOD AND DEVICE FOR TRANSMITTING INFORMATION FOR OPERATING STATION IN WIRELESS LOCAL AREA NETWORK SYSTEM SUPPORTING MULTIPLE BANDS

CROSS-REFERENCE TO RELATED APPLICATIONS

This application is the National Stage filing under 35 U.S.C. 371 of International Application No. PCT/KR2019/010000, filed on Aug. 8, 2019, which claims the benefit of earlier filing date and right of priority to Korean Application Nos. 10-2018-0094062, filed on Aug. 10, 2018 and 10-2019-0077343, filed on Jun. 27, 2019, the contents of which are all hereby incorporated by reference herein in their entirety.

BACKGROUND OF THE DISCLOSURE

Field of the Disclosure

The present disclosure relates to a technique for transmitting and receiving data in a wireless local area network (WLAN) system supporting multiple bands, and more particularly, to a technique for transmitting and receiving various control information to support an operation of a station in a WLAN system supporting multiple links.

Related Art

In many telecommunication systems, communication networks are used to exchange messages between spatially separated devices. Networks may be classified according to geographical range, which may be, for example, a metropolitan area, a local area, or a personal area. These networks may each be designated as a wide area network (WAN), metropolitan area network (MAN), local area network (LAN), or personal area network (PAN). Networks differ according to switching/routing techniques (e.g., circuit switching versus packet switching) used for interconnection of various network nodes and devices, types of physical mediums employed for transmission (e.g., wired versus wireless), and a set (e.g., Internet protocol suite, synchronous optical networking (SONET), Ethernet, etc.) of communication protocols in use.

Wireless network technologies may include various types of wireless local area networks (WLANs). WLANs may be used to interconnect nearby devices together by employing widely used networking protocols. Various technical features described herein may be applied to any communication standard, such as Wi-Fi or, more generally, any one of the IEEE 802.11 radio protocol groups.

For example, various aspects described herein may be used as part of an IEEE 802.11 protocol, such as an 802.11 protocol that supports orthogonal frequency-division multiple access (OFDMA) communications. For example, the IEEE 802.11ax standard proposed an improved communication environment using OFDMA and downlink multi-user multiple input, multiple output (DL MU MIMO) techniques.

This disclosure proposes technical features that improve the legacy WLAN or that may be utilized in a new communication standard. For example, the new communication standard may be an extreme high throughput (EHT) standard which has lately been under discussion. The EHT standard may use a newly proposed increased bandwidth, an improved physical (PHY) protocol data unit (PPDU) structure, an improved sequence, and a hybrid automatic repeat request (HARQ) technique.

SUMMARY

As new wireless local area network (WLAN) standards are discussed, a technique for performing communication in multiple bands should be proposed. For example, a technique for establishing multiple links on different bands such as 2.4 GHz, 5 GHz, and 6 GHz is proposed. That is, a multilink technique has been proposed.

However, since multilink communication was not supported in the legacy WLAN technique, a technique for various information related to multilink to be transmitted and received between AP/user-STA has not been properly defined.

In addition, a technique for properly transmitting and receiving capability information related to an improved communication technique related to multilink has not been defined in an AP/user-STA in which multilink communication may be supported, Thus, a technical problem that efficient communication is not performed between AP/user-STA may arise in a case where a new WLAN supports multiple bands.

An example according to the present disclosure relates to a method and/or device for receiving a signal in a wireless local area network (WLAN) system.

In an aspect, a method used in a WLAN system may include: transmitting, by a first station (STA) that aggregates a plurality of links including a first link and a second link, a first control frame including first information related to a preferred link of the first STA and second information related to whether signal sharing is possible in the plurality of links to a second STA.

The method may further include: performing a negotiation related to the plurality of links with the second STA upon receiving a second frame in response to the first control frame.

The method may further include: performing data communication with the second STA based on the negotiation.

Advantageous Effects

The present disclosure proposes a method and device for performing efficient communication in multiple bands. For example, an example of the present disclosure proposes an efficient technique for establishing multiple links on different bands such as 2.4 GHz, 5 GHz, and 6 GHz.

In addition, an example of the present disclosure proposes a technique in which various information related to multilink is transmitted and received between AP/user-STA.

In addition, an example of the present disclosure proposes a technique in which capability information related to an improved communication technique related to multilink is appropriately transmitted and received within an AP/user-STA in which multilink communication may be supported.

Therefore, an example of the present disclosure may have a technical effect of performing efficient communication in a WLAN system supporting multiple bands.

BRIEF DESCRIPTION OF THE DRAWINGS

FIG. 3 illustrates frequency domains used in a WLAN system.

FIG. 27 illustrates an example of a multi-band element based on the legacy IEEE 802.11ad standard.

FIG. 28 illustrates an example of a frame including first and second information.

DESCRIPTION OF EXEMPLARY EMBODIMENTS

When it is mentioned that a configuration includes specific elements in this disclosure or when it is mentioned that a certain process includes specific steps, it may mean that any other elements or any other steps may be further included. That is, the terms used herein are merely intended to describe particular embodiments and are not intended to limit the concepts of the present disclosure.

As used herein, a slash (/) or comma may indicate "and/or". For example, "A/B" may indicate "A and/or B," and therefore may mean "only A", "only B", or "A and B". Technical features that are separately described in one drawing may be implemented separately or may be implemented simultaneously.

As used herein, parentheses may indicate "for example". Specifically, "control information (Signal)" may mean that "Signal" is proposed as an example of "control information". Further, "control information (i.e., signal)" may also mean that "signal" is proposed as an example of "control information".

The following examples of the present disclosure may be applied to various wireless communication systems. For example, the following examples of the present disclosure may be applied to a wireless local area network (WLAN) system. For example, the present disclosure may be applied to IEEE 802.11a/g/n/ac or IEEE 802.11ax. The present disclosure may also be applied to a newly proposed EHT standard or a new WLAN stand which has enhanced IEEE 802.11be.

Hereinafter, technical features of the WLAN system to which the present disclosure may be applied will be described to describe the technical features of the present disclosure.

Figure 1:
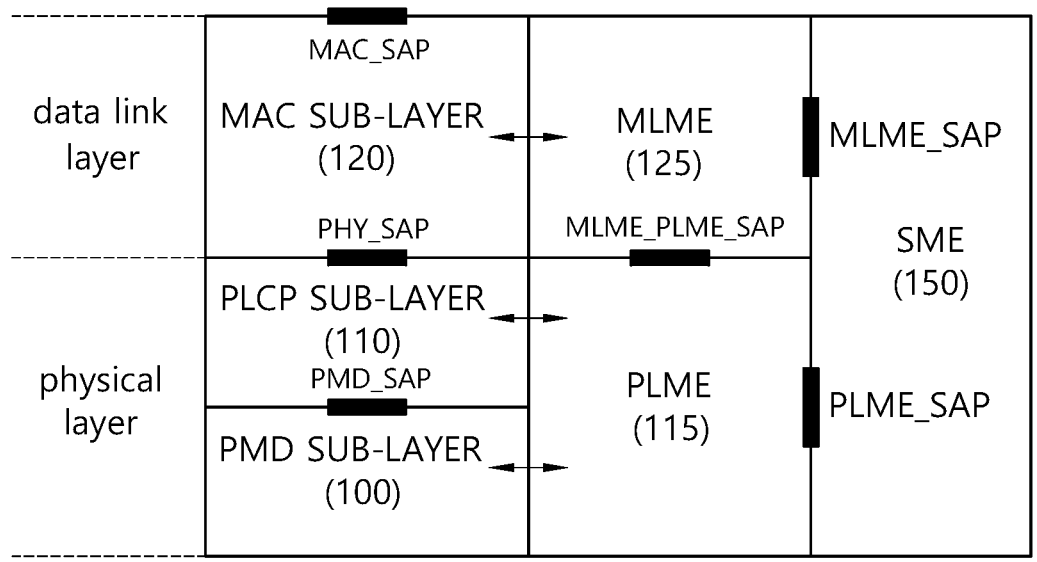
FIG. 1 is a conceptual diagram of a hierarchical architecture of a wireless local area network (WLAN) system supported by IEEE 802.11.

FIG. 1 is a conceptual diagram of a hierarchical architecture of a WLAN system supported by IEEE 802.11. Referring to FIG. 1, a layer architecture of the WLAN system may include a physical medium dependent (PMD) sub-layer 100, a physical layer convergence procedure (PLCP) sub-layer 110, and a medium access control (MAC) sub-layer 120.

The PMD sub-layer 100 may serve as a transmission interface for transmitting and receiving data between a plurality of STAs. The PLCP sub-layer 110 is implemented so that the MAC sub-layer 120 may operate with minimal dependency on the PMD sub-layer 100.

The PMD sub-layer 100, the PLCP sub-layer 110, and the MAC sub-layer 120 may each conceptually include a management entity. For example, the management entity of the MAC sub-layer 120 is referred to as a MAC Layer management entity (MLME) 125. The management entity of the physical layer is referred to as a PHY layer management entity (PLME) 115.

These management entities may provide an interface for performing a layer management operation. For example, the PLME 115 may be connected to the MLME 125 to perform a management operation of the PLCP sub-layer 110 and the PMD sub-layer 100. The MLME 125 may be connected to the PLME 115 to perform a management operation of the MAC sub-layer 120.

In order to perform a proper MAC layer operation, an STA management entity (SME) 150 may exist. The SME 150 may be operated as an independent component for each layer. The PLME 115, the MLME 125, and the SME 150 may transmit and receive information with each other based on a primitive.

A brief description of the operation at each sub-layer is as follows. For example, the PLCP sub-layer 110 delivers a MAC protocol data unit received from the MAC sub-layer 120 to the PMD sub-layer 100 or delivers a frame received from the PMD sub-layer 100 to the MAC sub-layer 120 according to an instruction of the MAC layer between the MAC sub-layer 120 and the PMD sub-layer 100.

The PMD sub-layer 100, as a PLCP sub-layer, may transmit and receive data between a plurality of STAs through a wireless medium. An MPDU delivered by the MAC sub-layer 120 is referred to as a physical service data unit ("PSDU") in the PLCP sub-layer 110. The MPDU is similar to the PSDU, but in a case where an aggregated MPDU (AMPDU) obtained by aggregating a plurality of MPDUs is delivered, individual MPDUs and PSDUs may be different from each other.

In the process of receiving the PSDU from the MAC sub-layer 120 and transmitting the PSDU to the PMD sub-layer 100, the PLCP sub-layer 110 adds an additional field including necessary information by a transceiver of the physical layer. Here, the added field may be a PLCP preamble, a PLCP header, and tail bits required to return a convolutional encoder to a zero state in the PSDU.

The PLCP sub-layer 110 generates a physical (PHY) protocol data unit (PPDU) by adding the aforementioned fields to the PSDU and transmits the PPDU to a receiving station through the PMD sub-layer 100, and the receiving station receives the PPDU and obtains information required for data restoration from the PLCP preamble and the PLCP header to restore the PPDU.

The STA is an arbitrary functional medium including a medium access control (MAC) and a physical layer interface for a wireless medium following regulations of the IEEE (Institute of Electrical and Electronics Engineers) 802.11 standard. In a broad sense, the STA may be used to include both an AP and a non-AP STA.

The STA may be referred to by various names such as a mobile terminal, a wireless device, a wireless transmit/receive unit (WTRU), a user equipment (UE), a mobile station (MS), a mobile subscriber unit, or simply a user.

Figure 2:
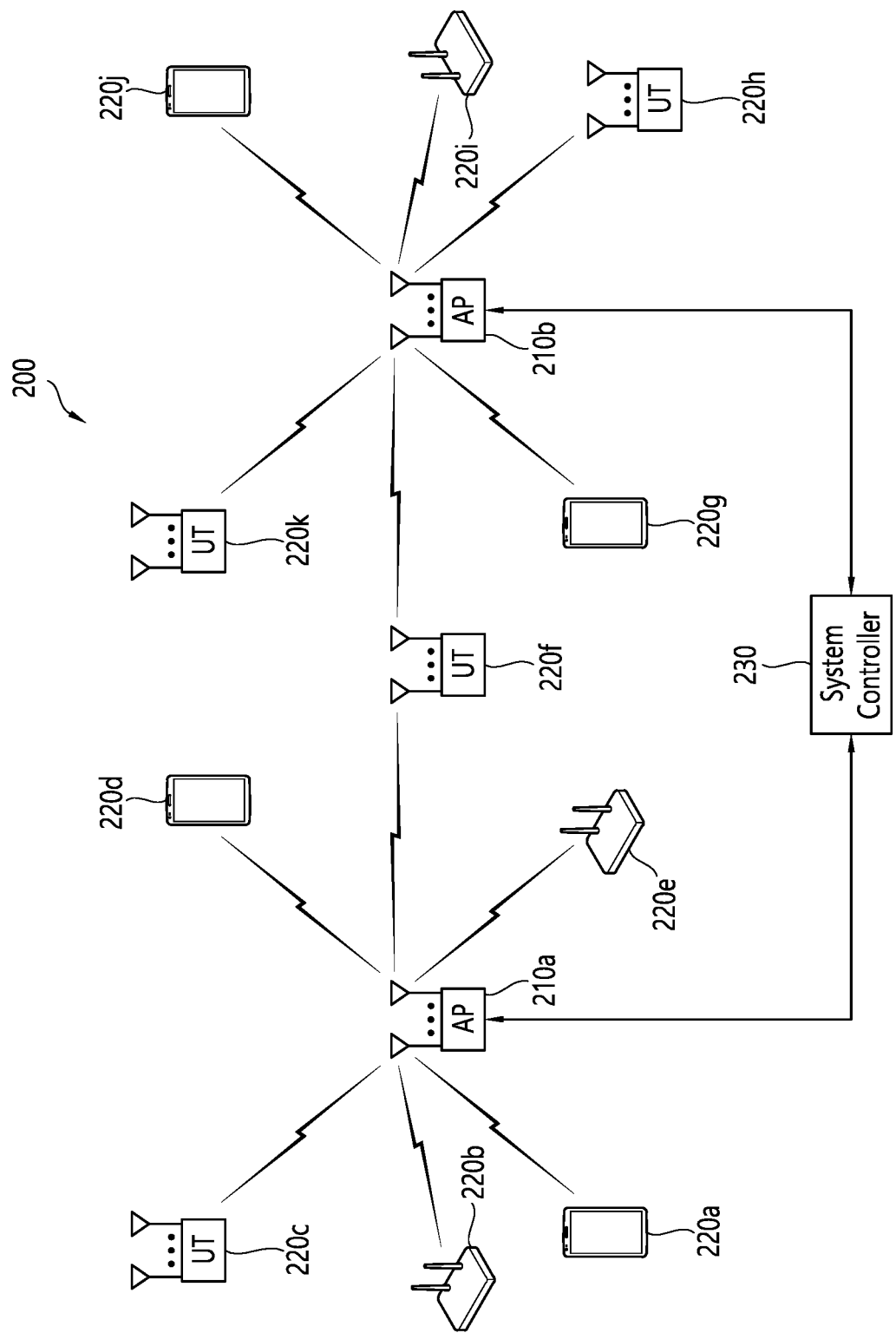
FIG. 2 illustrates an example of a WLAN system.

FIG. 2 illustrates an example of a WLAN system.

As shown, the WLAN system includes at least one access point (AP) and a plurality of STAs (220a/b/c/e/d/f/g/h/i/j/k) associated between the corresponding at least one AP. A plurality of STAs in the example of FIG. 2 may perform functions of an AP and/or a non-AP. The plurality of STAs (220a/b/c/e/d/f/g/h/i/j/k) of FIG. 2 may be referred to by various names such as user terminal (UT) or the like. In addition, at least one STA 220f of FIG. 2 may route/relay communication between a plurality of APs 510a/b, perform control on a plurality of APs, or perform control on an STA connected to a plurality of APs 210a/b.

In addition, the AP 210a/b of FIG. 2 may be connected to a system controller 230 to communicate with another AP or may communicate with another network entity (e.g., a network entity defined by the 3GPP standard or Internet server).

A plurality of STAs illustrated in FIG. 2 may configure a basic service set (BSS).

BSSs and are a set of APs and STAs such as APs and STAs that may communicate with each other through successful synchronization and do not refer to a specific area. The BSS may include one or more STAs that may be combined with one AP.

The BSS may include at least one STA, an AP providing a distribution service, and a distributed system connecting a plurality of APs.

A distributed system may configure an extended service set (ESS) by connecting several BSSs. The ESS may be used as a term indicating one network formed by connecting one or several APs through a distributed system. APs included in one ESS may have the same service set identification (SSID).

A portal may serve as a bridge for connecting a WLAN network (IEEE 802.11) and another network (e.g., 802.X).

Even between STAs without an AP, a network may be established to perform communication. Such a network may be referred to as an ad-hoc network or an independent basic service set (IBSS).

FIG. 3 illustrates frequency domains used in a WLAN system.

The WLAN system may use at least one channel defined in the 2.4 GHz band. The 2.4 GHz band may be referred to by other names such as a first band.

As illustrated in FIG. 3, 14 channels may be configured in the 2.4 GHz band. Each channel may be set to a frequency region (or bandwidth) of 20 MHz. $F_0$ may represent a center frequency. The center frequencies of the channels in the 2.4 GHz band may be configured at approximately 5 MHz intervals except for channel 14. Adjacent channels among the 14 channels may overlap each other. An allowable frequency channel or a maximum power level in the allowable frequency channel may be set to be different in each country. For example, channel 13 is not allowed in North America but is allowed in most countries.

The specific values illustrated in the example of FIG. 3 may be changed.

Figure 4:
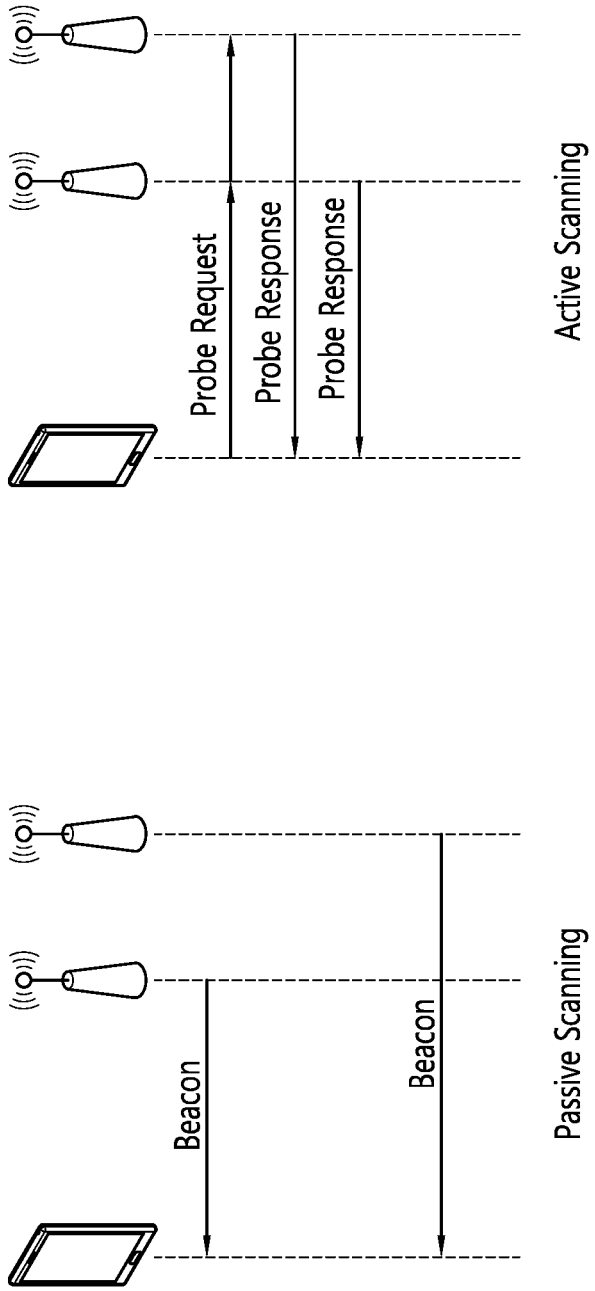
FIG. 4 illustrates an example of network discovery.

FIG. 4 illustrates an example of network discovery.

In order to access the WLAN network, the STA should perform network discovery. Such discovery may be performed through a scanning process for a network. The scanning method may be divided into active scanning and passive scanning.

As illustrated in FIG. 4, the STA that performs active scanning may transmit a probe request frame to search for an AP present in the vicinity, while moving channels, and wait for a response thereto. A responder may transmit a probe response frame to the STA that has transmitted the probe request frame in response to the probe request frame. The responder may be an STA that last transmitted a beacon frame in a BSS of the channel being scanned. In the BSS, since an AP transmits a beacon frame, the AP becomes a responder, and in an IBSS, since STAs in the IBSS transmit beacon frames by taking turns, the responder may be changed.

When the STA transmits the probe request frame through channel #1 and receives the probe response frame through channel #1, the STA may store BSS-related information included in the received probe response frame, move to a next channel (e.g., channel #2), and repeat scanning in the same manner.

As illustrated in FIG. 4, the scanning operation may also be performed by the passive scanning method. An STA that performs scanning based on passive scanning may receive a beacon frame, while moving channels.

The beacon frame is an example of a management frame in IEEE 802.11. The beacon frame may be transmitted periodically. The STA receiving the beacon frame may store BSS-related information included in the received beacon frame, move to a next channel, and perform passive scanning in the next channel.

Although not illustrated in FIG. 4, a number of procedures may be performed after the scanning procedure of FIG. 4.

For example, an authentication process may be performed after the scanning procedure. The authentication process may include a process in which the STA transmits an authentication request frame to the AP and the AP transmits an authentication response frame to the STA in response thereto. An authentication frame used for authentication request/response corresponds to a management frame.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

Figure 5:
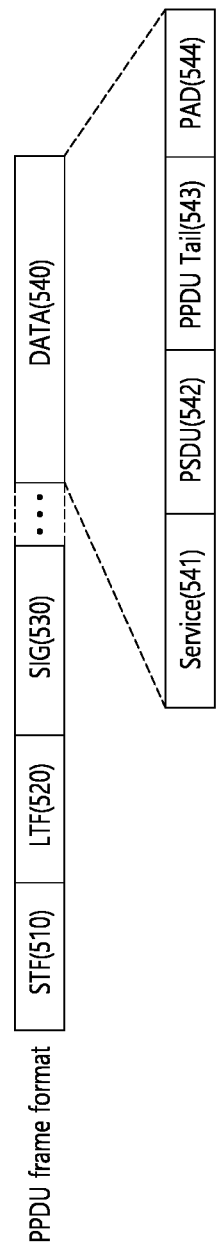
FIG. 5 illustrates an example of a physical protocol data unit (PPDU) transmitted and received by an STA of the present disclosure.

FIG. 5 illustrates an example of a PPDU transmitted and received by an STA of the present disclosure.

An example of FIG. 5 illustrates a typical field of a PPDU, and the order of the fields illustrated in FIG. 5 may be variously changed.

The PPDU of FIG. 5 may include a short training field (STF) 510.

The STF 510 may be embodied as L-STF, HT-STF, VHT-STF, HE-STF, EHT-STF, and the like which will be described later. The STF 510 may be used for frame detection, automatic gain control (AGC), diversity detection, coarse frequency/time synchronization, and the like.

The PPDU of FIG. 5 may include a long training field (LTF) 520.

The LTF 520 may be embodied as L-LTF, HT-LTF, VHT-LTF, HE-LTF, EHT-LTF, and the like which will be described later. The LTF 520 may be used for fine frequency/time synchronization and channel prediction.

The PPDU of FIG. 5 may include an SIG 530.

The SIG 530 may be embodied as L-SIG, HT-SIG, VHT-SIG, HE-SIG, EHT-SIG, and the like which will be described later. The SIG 530 may include control information for decoding the PPDU.

The PPDU of FIG. 5 may include a data field 540.

The data field 540 may include a SERVICE field 541, a physical layer service data unit (PSDU) 542, a PPDU TAIL bit 543, and a padding bit 544. Some bits of the SERVICE field 541 may be used for synchronization of a descrambler at a receiving end. The PSDU 542 corresponds to a MAC protocol data unit (MPDU) defined in the MAC layer and may include data generated/used in a higher layer. The PPDU tail bit 543 may be used to return an encoder to a state of 0. The padding bit 544 may be used to adjust a length of the data field to a predetermined unit.

Figure 6:
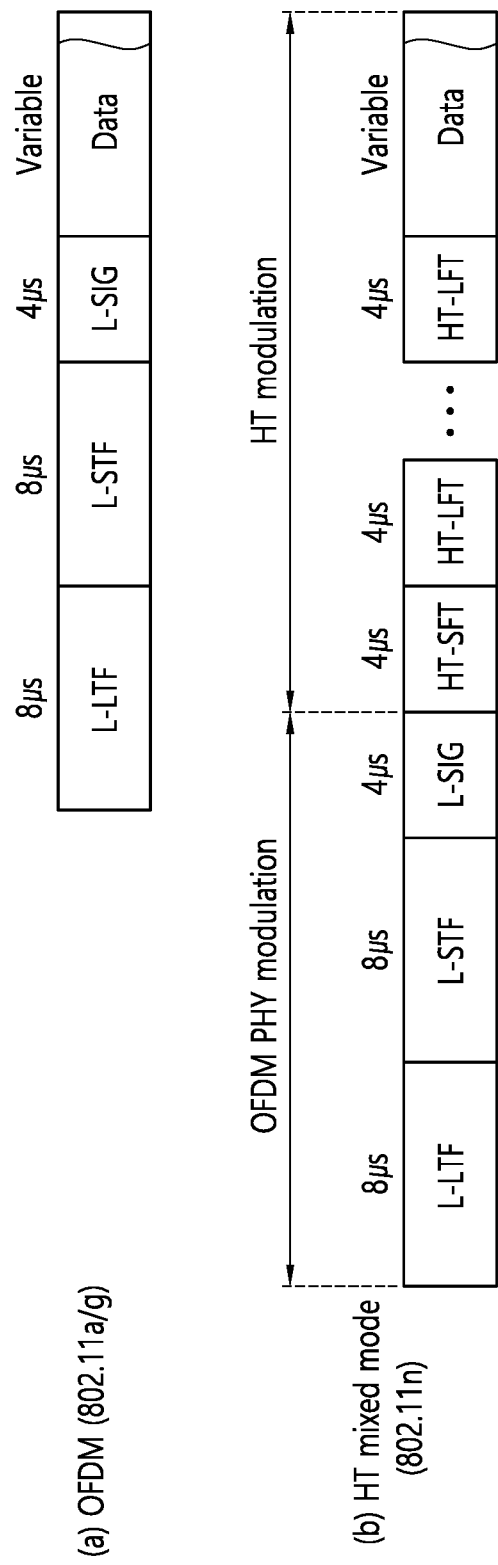
FIG. 6 illustrates an example of a PPDU according to the legacy WLAN standard.

FIG. 6 illustrates an example of a PPDU according to the legacy WLAN standard.

A PPDU illustrated in sub-drawing (a) of FIG. 6 is an example of a PPDU used in the IEEE 802.11a/g standard.

A PPDU illustrated in sub-drawing (b) of FIG. 6 is an example of a PPDU used in the IEEE 802.11n standard.

Figure 7:
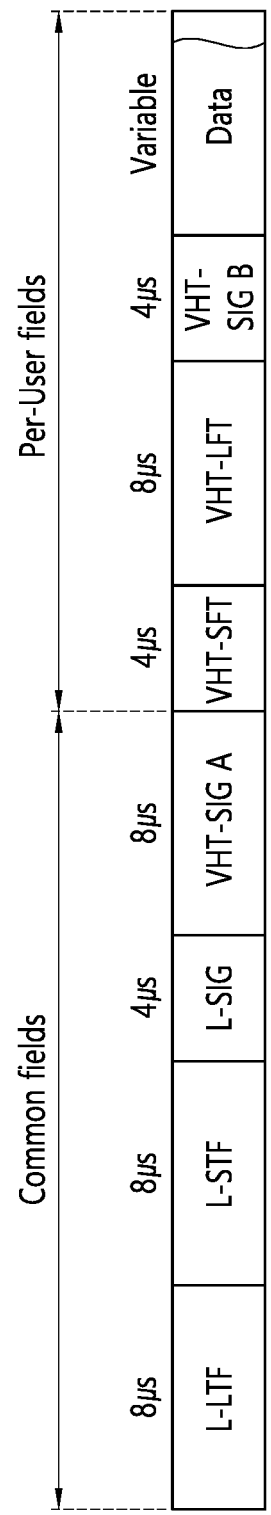
FIG. 7 illustrates another example of a PPDU according to the legacy WLAN standard.

FIG. 7 illustrates another example of a PPDU according to the legacy WLAN standard.

FIG. 7 shows an example of a PPDU according to the IEEE 802.11ac standard. Illustrated common fields include the legacy L-STF, L-LTF, and L-SIG, and also include a VHT-SIG A field newly proposed in the IEEE 802.11ac standard. The PPDU of FIG. 7 may be used both in single user (SU) communication in which a signal is transmitted from an AP to one user STA and in multi-user (MU) communication in which signals are transmitted from an AP to a plurality of user STAs. When MU communication is performed, the VHT-SIG A field includes common control information commonly applied to all receiving STAs.

Per-User fields illustrated in FIG. 7 include fields transmitted for at least one user STA when MU communication is performed. A VHT-STF field is an STF field newly proposed in the VHT standard (i.e., IEEE 802.11ac), and a VHT-LTF field is an LTF field newly proposed in the VHT standard. A VHT-SIG B field includes information for decoding a data field and may be individually configured for each receiving STA.

The PPDU of FIG. 7 may be transmitted to a plurality of STAs based on a multi-user multiple input, multiple output (MU-MIMO) technique. In addition, the PPDU may be transmitted to one STA based on the SU-MIMO technique.

Figure 8:
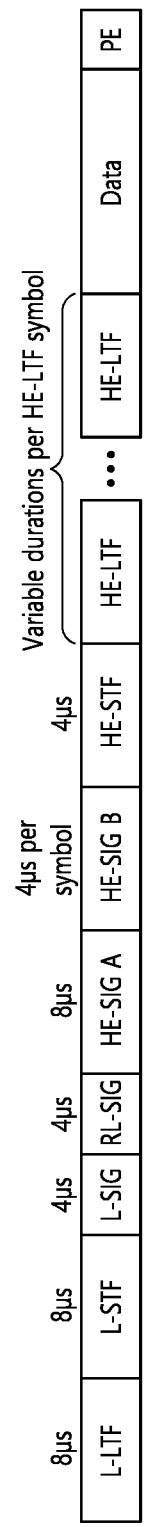
FIG. 8 illustrates another example of an HE-PPDU.

FIG. 8 illustrates another example of an HE-PPDU.

The example of FIG. 8 may be applied to an IEEE 802.11ax or high efficiency (HE) WLAN system. There are four types of PPDU formats according to the IEEE 802.11ax, and an example of FIG. 8 is an example of MU-PPDU used in MU communication. However, some of the technical features applied to the field illustrated in FIG. 8 may be used as it is in SU communication or UL-MU communication.

The technical features of the HE-PPDU illustrated in FIG. 8 may also be applied to a newly proposed EHT-PPDU. For example, technical features applied to an HE-SIG may also be applied to an EHT-SIG, and technical features applied to an HE-STF/LTF may also be applied to an EHT-SFT/LTF.

An L-STF of FIG. 8 may include a short training orthogonal frequency division multiplexing (OFDM) symbol. The L-STF may be used for frame detection, automatic gain control (AGC), diversity detection, and coarse frequency/time synchronization.

The L-LTF of FIG. 8 may include a long training orthogonal frequency division multiplexing (OFDM) symbol. The L-LTF may be used for fine frequency/time synchronization and channel prediction.

An L-SIG of FIG. 8 may be used to transmit control information. The L-SIG may include information related to a data rate and data length. In addition, the L-SIG may be repeatedly transmitted. That is, the L-SIG may be configured in a format in which L-SIG is repeated (e.g., it may be referred to as RL-SIG).

An HE-SIG A of FIG. 8 may include control information common to receiving STAs.

Specifically, the HE-SIG A may include 1) a DL/UL indicator, 2) a BSS color field which is an identifier of a BSS, 3) a field indicating a remaining time of a current TXOP section, 4) a bandwidth field indicating 20, 40, 80, 160, 80+80 MHz, 5) a field indicating an MCS scheme applied to an HE-SIG B, 6) a field indicating whether the HE-SIG B is modulated according to a dual subcarrier modulation technique for MCS, 7) a field indicating the number of symbols used for the HE-SIG B, 8) a field indicating whether the HE-SIG B is generated over the entire band, 9) a field indicating the number of symbols of the HE-LTF, 10) a field indicating a length of the HE-LTF and a CP length, 11) a field indicating whether there is an additional OFDM symbol for LDPC coding, 12) a field indicating control information related to packet extension (PE), and 13) a field indicating information related to a CRC field of the HE-SIG A. These specific fields of the HE-SIG A may be added or some of them may be omitted. In addition, in environments other than a multi-user (MU) environments, some fields in the HE-SIG-A may be added or omitted.

As described above, the HE-SIG B of FIG. 8 may be included only in the case of a PPDU for multiple users (MU). Basically, the HE-SIG A or the HE-SIG B may include resource allocation information (or virtual resource allocation information) for at least one receiving STA.

An HE-STF of FIG. 8 may be used to improve automatic gain control estimation in a multiple input multiple output (MIMO) environment or an OFDMA environment.

An HE-LTF of FIG. 8 may be used to estimate a channel in the MIMO environment or the OFDMA environment.

A size of fast Fourier transform (FFT)/inverse fast Fourier transform (IFFT) applied to the HE-STF and a field after the HE-STF of FIG. 8 may be different from a size of the FFT/IFFT applied to the field before the HE-STF. For example, the size of the FFT/IFFT applied to the HE-STF and the field after the HE-STF may be 4 times larger than the size of the FFT/IFFT applied to the field before the HE-STF.

For example, when at least one field among L-STF, L-LTF, L-SIG, HE-SIG A, and HE-SIG B on the PPDU of FIG. 8 is referred to as a first field/part, at least one of a data field, HE-STF, and HE-LTF may be referred to as a second field/part. The first field may include a field related to the legacy system, and the second field may include a field related to an HE system. In this case, the size of FFT/IFFT may be defined as N times the size of FFT/IFFT used in the legacy WLAN system (N is a natural number, e.g., N=1, 2, and 4). That is, FFT/IFFT having a size of N (=4) times may be applied to the second field of the HE PPDU, compared to the first field of the HE PPDU. For example, 256 FFT/IFFT may be applied for a bandwidth of 20 MHz, 512 FFT/IFFT may be applied for a bandwidth of 40 MHz, 1024 FFT/IFFT is applied for a bandwidth of 80 MHz, and 2048 FFT/IFFT may be applied for a continuous or discontinuous bandwidth of 160 MHz.

In other words, subcarrier spacing may have a size of 1/N times subcarrier spacing used in the legacy WLAN system (N is a natural number, for example, when N=4, 78.125 kHz). That is, subcarrier spacing having a size of 312.5 kHz which is legacy subcarrier spacing may be applied to the first field/part of the HE PPDU, and subcarrier spacing having a size of 78.125 kHz may be applied to the second field/part of the HE PPDU.

Alternatively, an IDFT/DFT period applied to each symbol of the first field may be expressed to be N (=4) times shorter than the IDFT/DFT period applied to each data symbol of the second field. That is, a length of IDFT/DFT applied to each symbol of the first field of the HE PPDU may be expressed as 3.2 μs, and a length of IDFT/DFT applied to each symbol of the second field of the HE PPDU may be expressed as 3.2 μs*4 (=12.8 μs). A length of an OFDM symbol may be a value obtained by adding a length of a guard interval (GI) to the length of the IDFT/DFT. The length of the GI may be various values such as 0.4 μs, 0.8 μs, 1.6 μs, 2.4 μs, and 3.2 μs.

As described above, the technical features in which subcarrier spacing of different sizes is applied to one PPDU may also be applied to the EHT-PPDU as it is. That is, subcarrier spacing having a size of 312.5 kHz may be applied to the first field/part of the EHT-PPDU, and subcarrier spacing having a size of 78.125 kHz may be applied to the second field/part of the EHT PPDU. The first field/part of the EHT-PPDU may include L-LTF, L-STF, L-SIG, EHT-SIG-A, and/or EHT-SIG-B. In addition, the second field/part of the EHT-PPDU may include EHT-STF, EHT-LTF, and/or a data field. The classification of the first part/second part of the EHT-PPDU may be changed.

Hereinafter, a resource unit (RU) used in the PPDU will be described. The RU may include a plurality of subcarriers (or tones). The RU may be used in the case of transmitting signals to multiple STAs based on the OFDMA technique. Also, the RU may be defined even when a signal is transmitted to one STA. The RU may be used for STF, LTF, data field, and the like.

Figure 9:
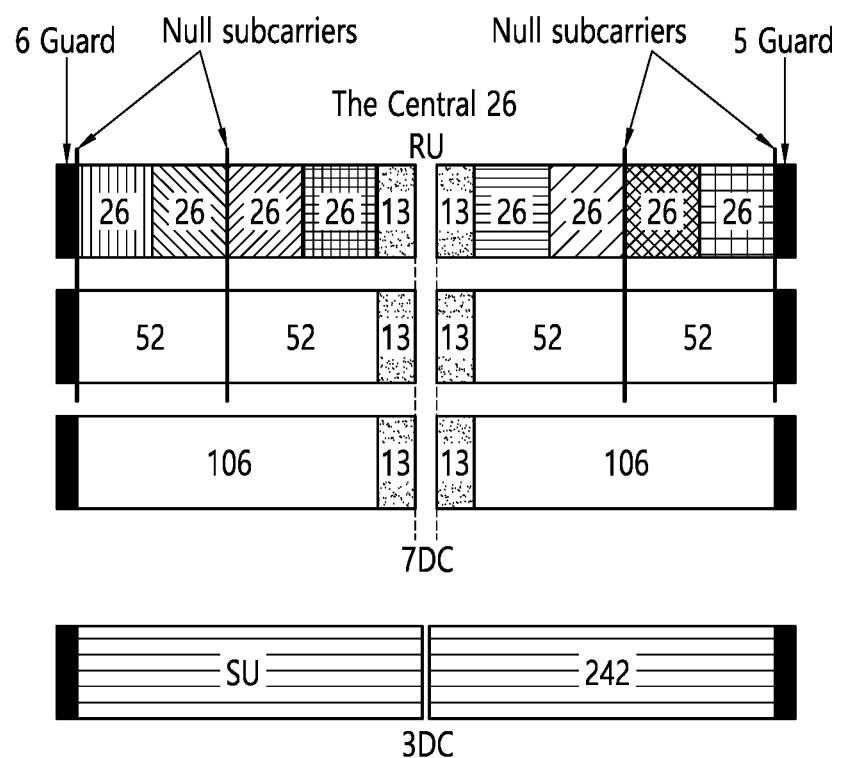
FIG. 9 illustrates a layout of resource units (RUs) used in a 20 MHz band.

FIG. 9 illustrates a layout of resource units (RUs) used in a band of 20 MHz.

As illustrated in FIG. 9, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 9, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 9 may be used not only for a multiple users (MUs) but also for a single user (SU), in which case one 242-unit may be used and three DC tones may be inserted as illustrated in the lowermost part of FIG. 9.

Although FIG. 9 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 10:
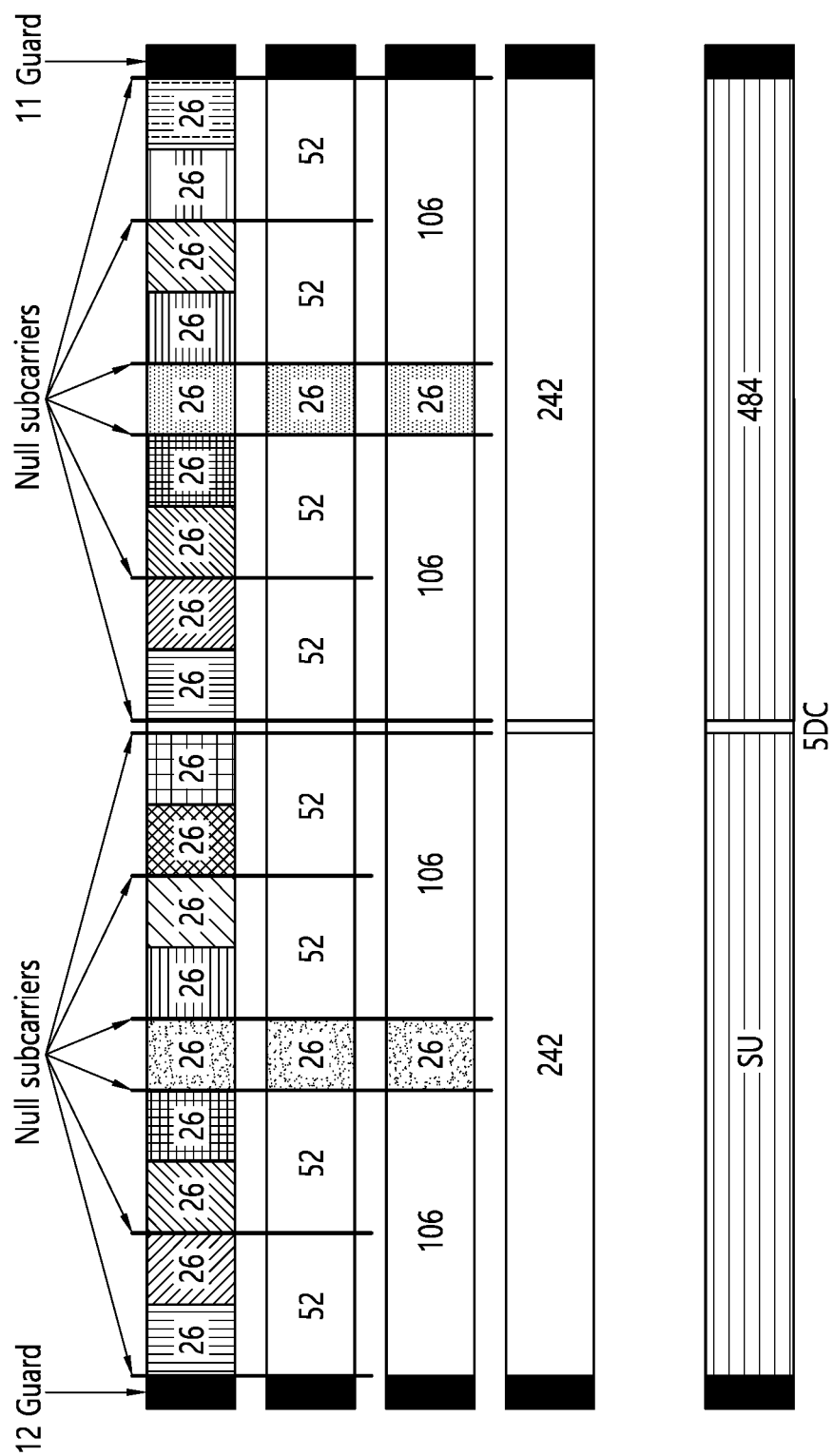
FIG. 10 illustrates a layout of RUs used in a 40 MHz band.

FIG. 10 illustrates a layout of RUs used in a band of 40 MHz.

Similarly to FIG. 9 in which RUs having various sizes are used, a 26-RU, a 52-RU, a 106-RU, a 242-RU, a 484-RU, and the like may be used in an example of FIG. 5. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 10, when the layout of the RUs is used for a single user, a 484-RU may be used. The specific number of RUs may be changed similarly to FIG. 9.

Figure 11:
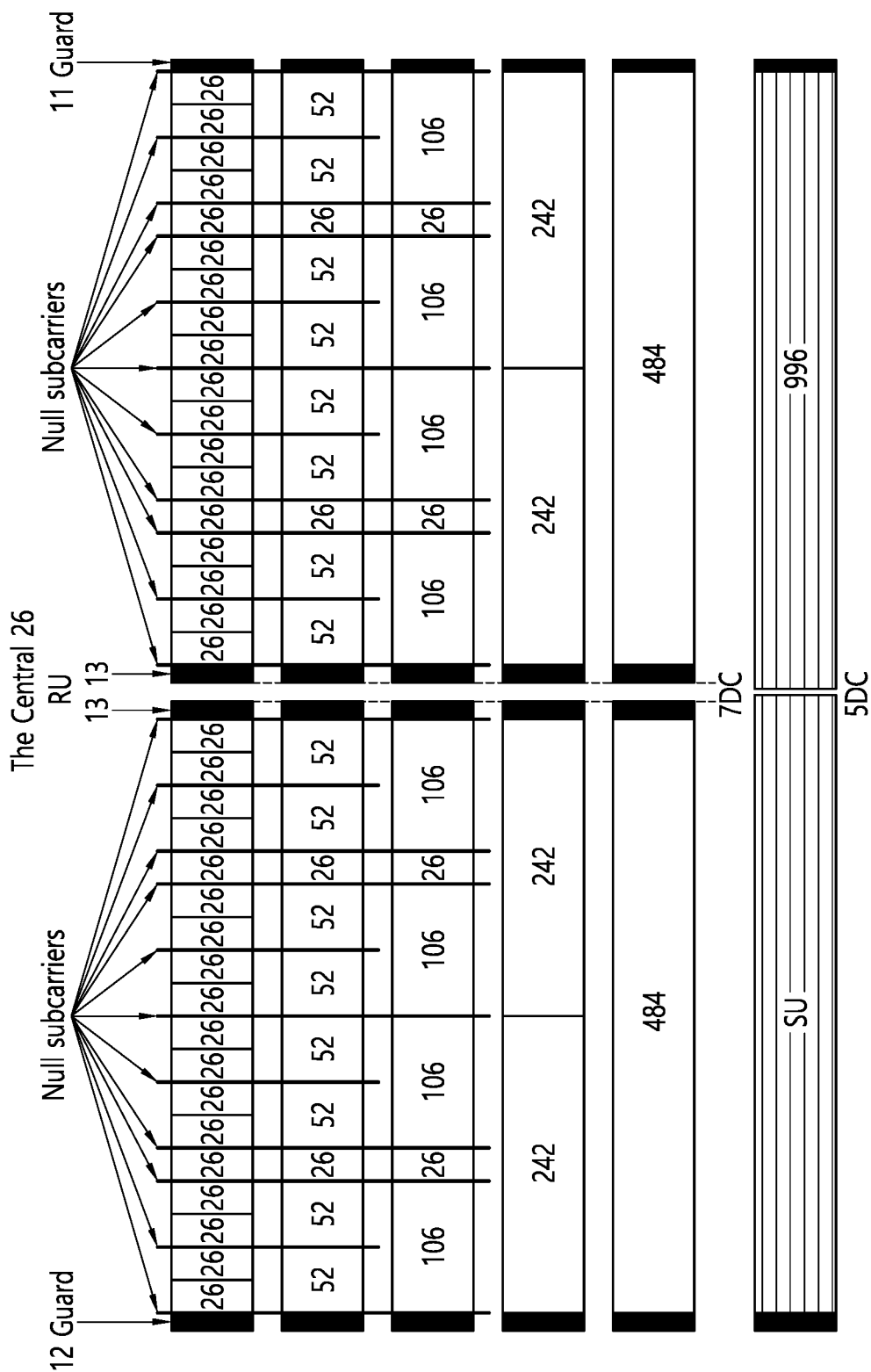
FIG. 11 illustrates a layout of RUs used in an 80 MHz band.

FIG. 11 illustrates a layout of RUs used in a band of 80 MHz.

Similarly to FIG. 9 and FIG. 10 in which RUs having various sizes are used, a 26-RU, a 52-RU, a 106-RU, a 242-RU, a 484-RU, a 996-RU, and the like may be used in an example of FIG. 6. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 6, when the layout of the RUs is used for a single user, a 996-RU may be used, in which case five DC tones may be inserted.

The specific number of RUs may be changed similarly to FIG. 9 and FIG. 10.

The RUs illustrated in FIGS. 9 to 11 may be used for OFDMA-based communication. That is, any one RU (26/52/106/242-RU, etc.) illustrated in FIGS. 9 to 11 may be allocated to one STA, and the other RU may be allocated to another STA. That is, MU communication may be performed by allocating the RUs illustrated in FIGS. 9 to 11 to a plurality of STAs. MU communication may be applied to downlink communication as well as to uplink communication.

For DL MU communication, the MU PPDU illustrated in FIG. 8 may be used. That is, DL-MU communication may be performed through OFDMA and/or MU-MIMO scheme based on the PPDU of FIG. 8.

In addition, UL MU communication is also supported in the WLAN system. A trigger frame is defined for UL MU communication. The trigger frame may include ID information related to a plurality of STAs participating in UL MU communication and radio resources (e.g., RU information) used in UL MU communication.

Figure 12:
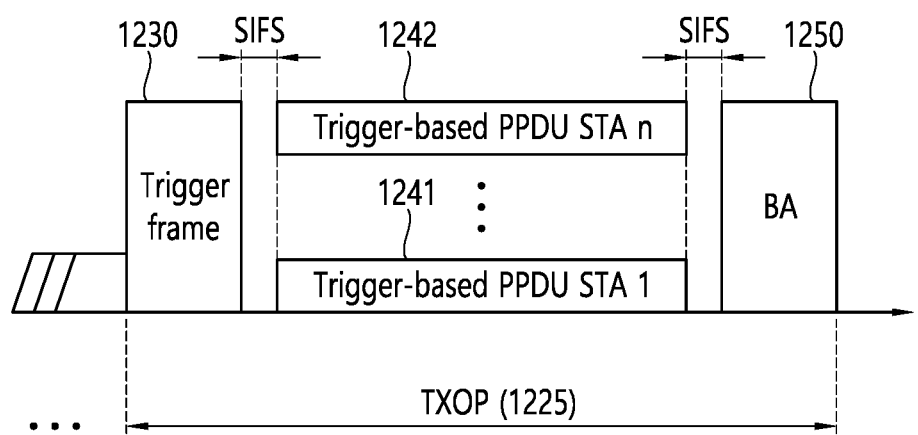
FIG. 12 illustrates an example of UL MU communication.

FIG. 12 illustrates an example of UL MU communication.

According to the example of FIG. 12, the AP transmits a trigger frame 1230. The trigger frame may be defined in the form of a MAC frame and may be included in a PPDU of various formats and transmitted from the AP. That is, when a PPDU including the trigger frame 1230 is received by the STA, UL MU communication starts after a short interframe space (SIFS) period. Specifically, a plurality of STAs (i.e., STA 1 to STA n) indicated by the trigger frame 1230 perform UL-MU communication based on an uplink resource (i.e., RU) indicated by the trigger frame 1230. Specifically, the plurality of STAs (i.e., STA 1 to STA n) transmits a trigger-based (TB) PPDU according to the IEEE 802.11ax standard to the AP. A plurality of TB PPDUs transmitted by the plurality of STAs is transmitted in the same time period, and information related to the same time period may be included in the trigger frame 1230. Thereafter, the AP may transmit an ACK/NACK signal for TB PPDUs 1241 and 1242 through a block ACK (BA). UL MU communication may be performed within a TXOP 1225 period acquired by the AP.

Figure 13:
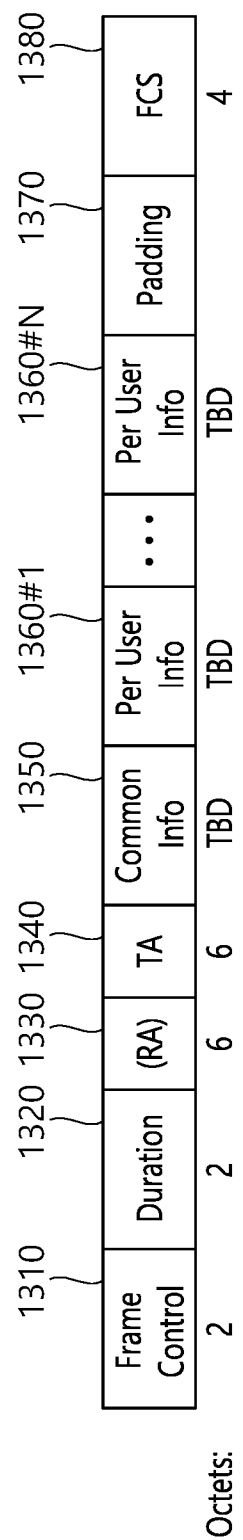
FIG. 13 illustrates an example of a trigger frame.

FIG. 13 illustrates an example of a trigger frame. The trigger frame of FIG. 13 may allocate resources for uplink multi-user transmission (MU) and may be transmitted from the AP. The trigger frame may include a MAC frame and may be included in a PPDU.

Some of the fields illustrated in FIG. 13 may be omitted and other fields may be added. Also, a length of each field may be changed to be different from that shown.

A frame control field 1310 of FIG. 13 may include information related to a version of a MAC protocol and other additional control information, and a duration field 1320 may include time information for setting up a network allocation vector (NAV) described below or information related to an identifier (e.g., AID) of the terminal.

In addition, an RA field 1330 may include address information of a receiving STA of the corresponding trigger frame and may be omitted as necessary. A TA field 1340 includes address information of an STA (e.g., AP) that transmits the corresponding trigger frame, and a common information field 1350 includes common control information applied to the receiving STA that receives the corresponding trigger frame.

Figure 14:
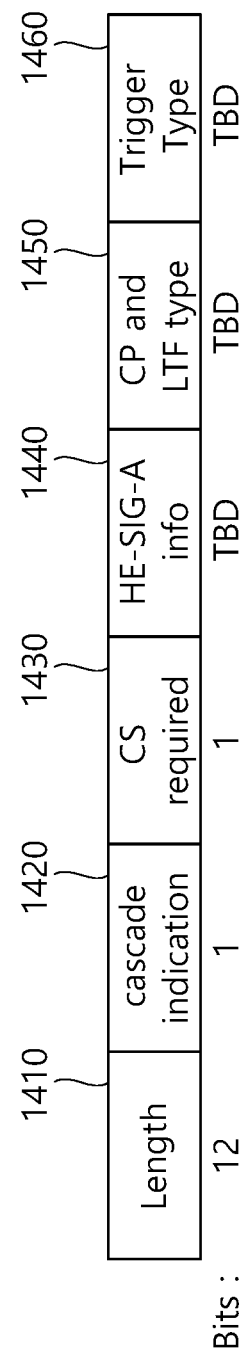
FIG. 14 illustrates an example of a common information field.

FIG. 14 illustrates an example of a common information field. Some of the subfields of FIG. 10 may be omitted and other subfields may be added. In addition, a length of each of the illustrated subfields may be changed.

An illustrated length field 1410 has the same value as a length field of an L-SIG field of an uplink PPDU transmitted in response to a corresponding trigger frame, and the length field of the L-SIG field of the uplink PPDU represents a length of the uplink PPDU. As a result, the length field 1410 of the trigger frame may be used to indicate the length of the corresponding uplink PPDU.

In addition, a cascade indication field 1420 indicates whether a cascade operation is performed. The cascade operation means that downlink MU transmission and uplink MU transmission are performed together in the same TXOP. That is, it means that, after downlink MU transmission is performed, uplink MU transmission is performed after a preset time (e.g., SIFS). During the cascade operation, only one transmitting device (e.g., AP) that performs downlink communication may exist and a plurality of transmitting devices (e.g., non-APs) that perform uplink communication may exist.

A CS required field 1430 indicates whether to consider a state of a wireless medium or a network allocation vector (NAV) in a situation in which a receiving device receiving the corresponding trigger frame transmits a corresponding uplink PPDU.

An HE-SIG-A information field 1440 includes information for controlling content of an SIG-A field (i.e., HE-SIG A field) of the uplink PPDU transmitted in response to the corresponding trigger frame.

A CP and LTF type field 1450 may include information related to a length of an LTF and a length of a CP of the uplink PPDU transmitted in response to the corresponding trigger frame. A trigger type field 1460 may indicate a purpose for using the corresponding trigger frame, for example, normal triggering, triggering for beamforming, a request for block ACK/NACK, and the like.

Meanwhile, a remaining description of FIG. 13 is added as follows.

It is preferred to include per user information fields 1360 #1 to 1360 #N) corresponding to the number of receiving STAs that receive the trigger frame of FIG. 13. The per user information fields may be referred to as "RU allocation fields".

In addition, the trigger frame of FIG. 13 may include a padding field 1370 and a frame check sequence field 1380.

It is preferred that each of the per user information fields 1360 #1 to 1360 #N illustrated in FIG. 13 includes a plurality of subfields.

Figure 15:
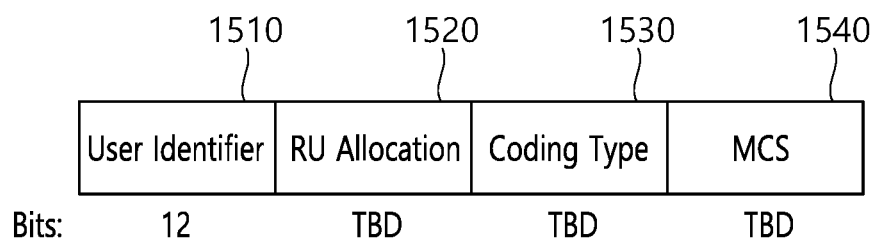
FIG. 15 illustrates an example of a subfield included in a per user information field.

FIG. 15 illustrates an example of subfields included in the per user information field. Some of the subfields of FIG. 15 may be omitted and other subfields may be added. In addition, a length of each of the illustrated subfields may be changed.

A user identifier field 1510 of FIG. 15 indicates an identifier of an STA (i.e., a receiving STA) to which per user information corresponds, and an example of the identifier may be the entirety of a portion of an AID.

In addition, an RU Allocation field 1520 may be included. That is, when the receiving STA identified by the user identifier field 1510 transmits an uplink PPDU in response to the trigger frame of FIG. 9, the receiving STA transmits the corresponding uplink PPDU through an RU indicated by the RU allocation field 1520. In this case, it is preferable that the RU indicated by the RU allocation field 1520 indicates the RUs illustrated in FIGS. 9, 10, and 11.

The subfields of FIG. 15 may include a coding type field 1530. The coding type field 1530 may indicate a coding type of an uplink PPDU transmitted in response to the trigger frame of FIG. 13. For example, when BCC coding is applied to the uplink PPDU, the coding type field 1530 may be set to '1', and when LDPC coding is applied, the coding type field 1530 may be set to '0'.

Further, the subfields of FIG. 15 may include an MCS field 1540. The MCS field 1540 may indicate an MCS scheme applied to the uplink PPDU transmitted in response to the trigger frame of FIG. 13.

Meanwhile, the STA may transmit various feedback (e.g., buffer status report or information related to a channel status) based on UL OFDMA random access (UORA) defined according to the IEEE 802.11ax standard.

Figure 16:
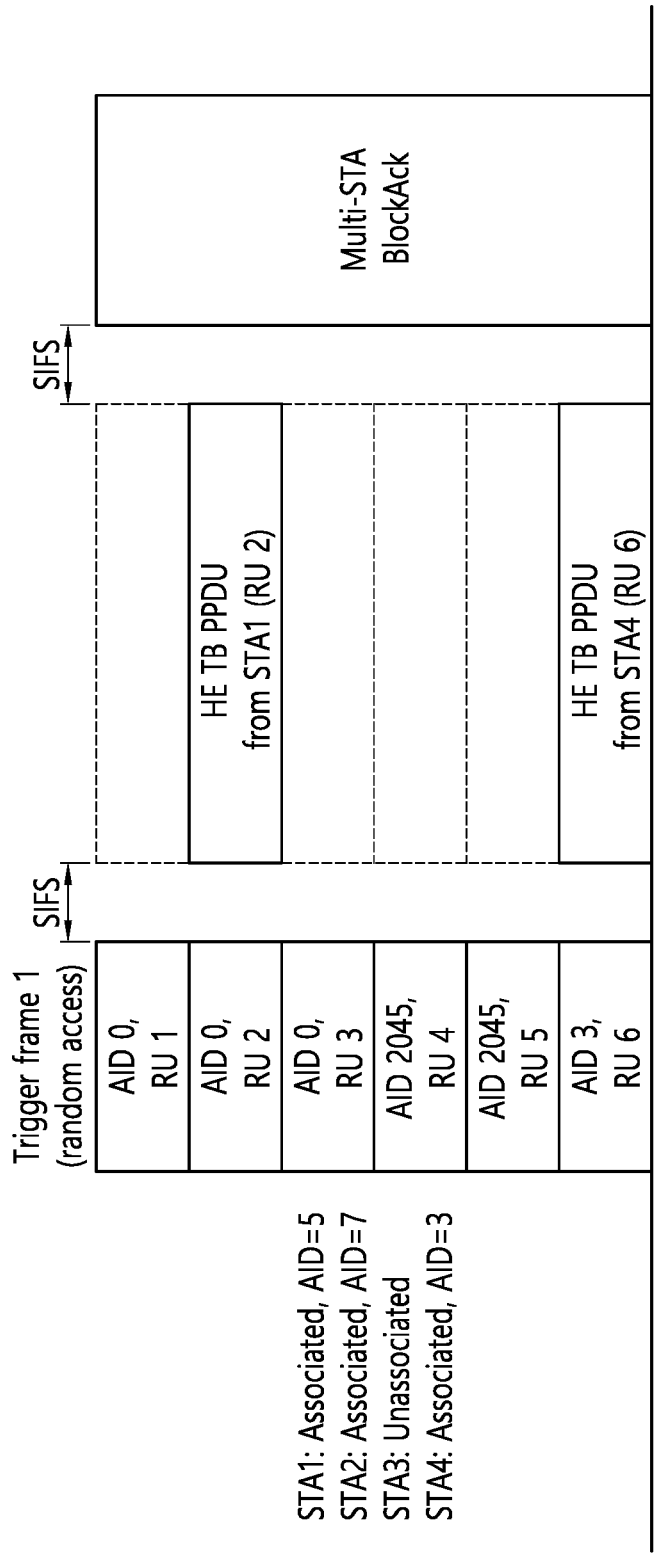
FIG. 16 illustrates a method of performing UORA in a WLAN system.

FIG. 16 illustrates a method of performing UORA in a WLAN system.

As illustrated, the AP may allocate six RU resources as illustrated in FIG. 16 through a trigger frame (e.g., FIGS. 13 to 15). Specifically, the AP may allocate a first RU resource (AID 0, RU 1), a second RU resource (AID 0, RU 2), a third RU resource (AID 0, RU 3), a fourth RU resource (AID 2045, RU 4), a fifth RU resource (AID 2045, RU 5), and a sixth RU resource (AID 2045, RU 6). Information related to AID 0 or AID 2045 may be included, for example, in the user identification field 1510 of FIG. 15. Information related to RU 1 to RU 6 may be included, for example, in the RU allocation field 1520 of FIG. 15. AID=0 may refer to a UORA resource for an associated STA, and AID=2045 may refer to a UORA resource for an unassociated STA. Accordingly, the first to third RU resources of FIG. 16 may be used as UORA resources for the associated STA, the fourth and fifth RU resources of FIG. 16 may be used for the unassociated STA, and the sixth RU resource of FIG. 16 may be used as a resource for a normal UL MU.

In the example of FIG. 16, an OFDMA random access BackOff (OBO) counter of STA1 is reduced to 0, so that STA1 randomly selects the second RU resource (AID 0, RU 2). In addition, since an OBO counter of STA2/3 is greater than 0, uplink resources are not allocated to STA2/3. In addition, since an AID (i.e., AID=3) of the STA4 is included in the trigger frame in FIG. 16, the resource of RU 6 is allocated to the STA4 without backoff.

Specifically, since STA1 of FIG. 16 is an associated STA, there are a total of three eligible RA RUs (RU 1, RU 2, and RU 3) for STA1, and accordingly, STA1 decreases the OBO counter by 3, and thus the OBO counter is zero. In addition, since STA2 of FIG. 16 is an associated STA, there are a total of 3 eligible RA RUs (RU 1, RU 2, and RU 3) for STA2, and accordingly, STA2 decreases the OBO counter by 3, but the OBO counter is greater than 0. In addition, since STA3 of FIG. 16 is an unassociated STA, there are a total of two eligible RA RUs (RU 4 and RU 5) for STA3, and accordingly, STA3 decreases the OBO counter by 2, but the OBO counter is greater than 0.

Figure 17:
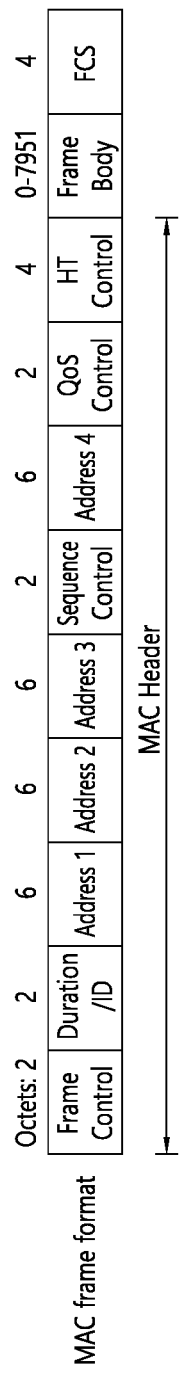
FIG. 17 illustrates an example of a MAC frame.

FIG. 17 illustrates an example of a MAC frame.

The MAC frame of FIG. 17 may be included in a physical layer service data unit (PSDU) included in the data field of the PPDU. A length of each field illustrated in FIG. 17 may be changed, and some of the fields may be omitted. As shown, the MAC frame may include a MAC header.

The data field may include a service field, a physical layer service data unit (PSDU), and a PPDU tail bit, and may optionally include a padding bit. Some bits of the service field may be used for synchronization of a descrambler at a receiving end. The PSDU may correspond to a MAC protocol data unit (MPDU) defined in a MAC layer and may include data generated/used in a higher layer. The PPDU tail bit may be used to return an encoder to a zero state. The padding bit may be used to adjust the length of the data field in a specific unit.

The MPDU is defined according to various MAC frame formats, and a basic MAC frame includes a MAC header, a frame body, and a frame check sequence (FCS). The MAC frame may include an MPDU and may be transmitted/received through a PSDU of a data part of a PPDU frame format.

The MAC header includes a frame control field, a duration/ID field, an address field, or the like. The frame control field may include control information required for frame transmission/reception. The duration/ID field may be set to a time for transmitting a corresponding frame or the like.

The duration/ID field included in the MAC header may be set to a 16-bit length (e.g., B0~B15). Content included in the duration/ID field may vary depending on a frame type and a subtype, whether it is transmitted during a contention free period (CFP), QoS capability of a transmitting STA, or the like. In a control frame of which a subtype is PS-poll, the duration/ID field may include an AID of a transmitting STA (e.g., through 14 LSBs), and two MSBs may be set to 1. (ii) In frames transmitted by a point coordinator (PC) or a non-QoS STA during a CFP, the duration/ID field may be set to a fixed value (e.g., 32768). (iii) In other frames transmitted by the non-QoS STA or control frames transmitted by the QoS STA, the duration/ID field may include a duration value defined for each frame type. In a data frame or management frame transmitted by the QoS STA, the duration/ID field may include a duration value defined for each frame type. For example, if the duration/ID field is set to B15=0, the duration/ID field is used to indicate a TXOP duration, and B0 to B14 may be used to indicate an actual TXOP duration. The actual TXOP duration indicated by B0 to B14 may be any one of 0 to 32767, and a unit thereof may be a microsecond (us). However, if the duration/ID field indicates a fixed TXOP duration value (e.g., 32768), B15=1 and B0 to B14=0. If set to B14=1 and B15=1, the duration/ID field is used to indicate an AID, and B0 to B13 indicate one AID ranging from 1 to 2007.

A frame control field of the MAC header may include Protocol Version, Type, Subtype, To DS, From DS, More Fragment, Retry, Power Management, More Data, Protected Frame, and Order subfields.

The STA (AP and/or non-AP STA) of the present disclosure may support multilink communication. The STA supporting multilink communication may simultaneously perform communication through multiple links. That is, the STA supporting multilink communication may perform communication through multiple links during a first time period and may perform communication through only one of the multiple links during a second time period.

Multilink communication may refer to communication supporting multiple links, and a link may include a channel (e.g., 20/40/80/160/240/320 MHz channels) defined in a 2.4 GHz band, a 5 GHz band, a 6 GHz band, and/or a specific band described below. Hereinafter, various bands and channels will be described.

Figure 18:
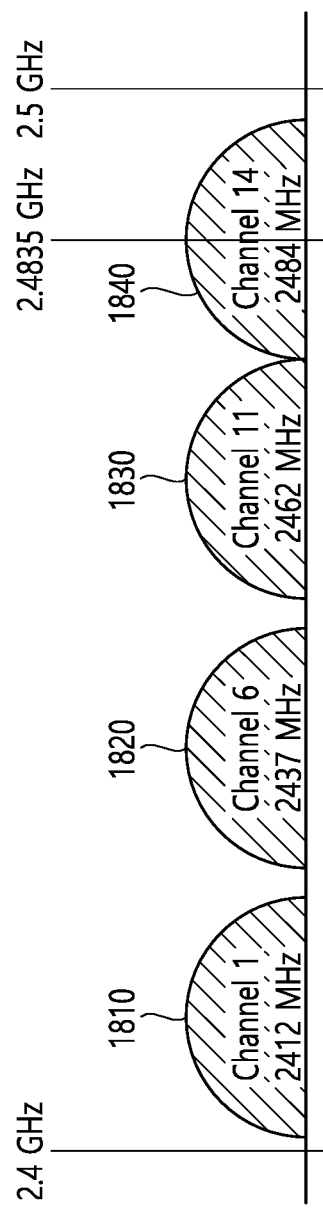
FIG. 18 illustrates an example of a channel used/supported/defined in a 2.4 GHz band.

FIG. 18 illustrates an example of channels used/supported/defined in a 2.4 GHz band.

The 2.4 GHz band may be referred to by other names such as a first band or the like. In addition, the 2.4 GHz band may refer to a frequency region in which channels with a center frequency adjacent to 2.4 GHz (e.g., channels with a center frequency located in 2.4 to 2.5 GHz) are used/supported/defined.

The 2.4 GHz band may include multiple 20 MHz channels. 20 MHz in the 2.4 GHz band may have multiple channel indexes (e.g., index 1 to index 14). For example, a center frequency of a 20 MHz channel to which channel index 1 is assigned may be 2.412 GHz, a center frequency of the 20 MHz channel to which channel index 2 is assigned may be 2.417 GHz, and a center frequency of the 20 MHz channel to which channel index N is assigned may be (2.407+0.005*N) GHz. The channel index may be referred to by various names such as channel number or the like. Specific values of the channel index and the center frequency may be changed.

FIG. 18 exemplarily illustrates four channels in a 2.4 GHz band. The illustrated first to fourth frequency regions 1810 to 1840 may each include one channel. For example, a first frequency region 1810 may include channel #1 (a 20 MHz channel having index 1). Here, a center frequency of channel #1 may be set to 2412 MHz. A second frequency region 1820 may include channel #6. Here, a center frequency of channel #6 may be set to 2437 MHz. A third frequency region 1830 may include channel #11. Here, a center frequency of channel #11 may be set to 2462 MHz. A fourth frequency region 1840 may include channel #14. Here, a center frequency of channel #14 may be set to 2484 MHz.

Figure 19:
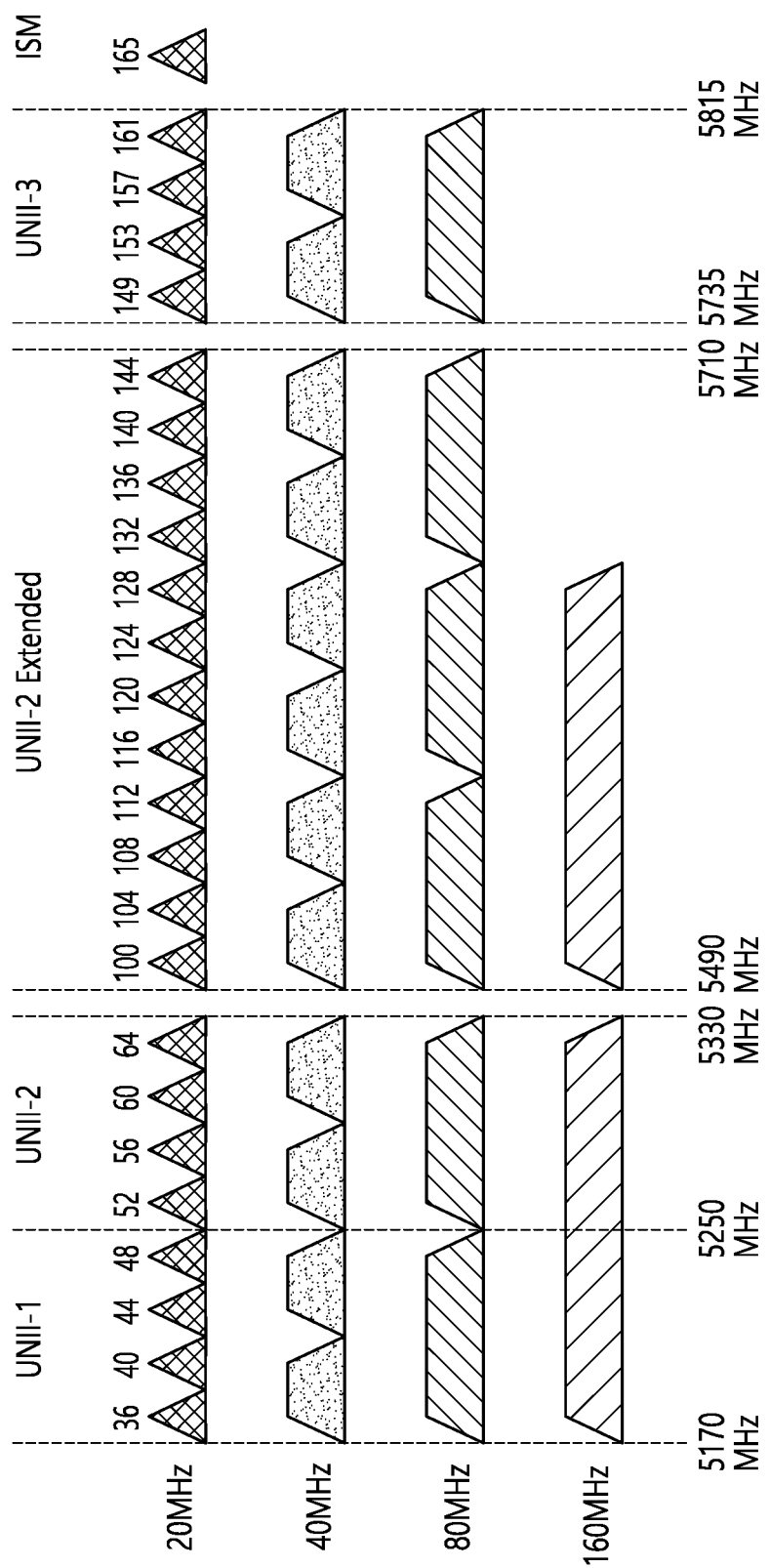
FIG. 19 illustrates an example of a channel used/supported/defined in a 5 GHz band.

FIG. 19 illustrates an example of a channel used/supported/defined in a 5 GHz band.

The 5 GHz band may be referred to by other names such as a second band. The 5 GHz band may refer to a frequency region (or frequency range) in which channels having a center frequency of 5 GHz or higher and less than 6 GHz (or less than 5.9 GHz) are used/supported/defined. Alternatively, the 5 GHz band may include a plurality of channels between 4.5 GHz and 5.5 GHz. The specific values illustrated in FIG. 19 may be changed.

A plurality of channels in the 5 GHz band include unlicensed national information infrastructure (UNII)-1, UNII-2, UNII-3, and ISM. UNII-1 may be called UNII Low. UNII-2 may include a frequency region called UNII Mid and UNII-2 Extended. UNII-3 may be called UNII-Upper.

A plurality of channels may be set in the 5 GHz band, and a bandwidth of each channel may be variously set to 20 MHz, 40 MHz, 80 MHz, or 160 MHz. For example, the 5170 MHz to 5330 MHz frequency region/range in UNII-1 and UNII-2 may be divided into eight 20 MHz channels. The 5170 MHz to 5330 MHz frequency region/range may be divided into four channels through the 40 MHz frequency region. The 5170 MHz to 5330 MHz frequency region/range may be divided into two channels through the 80 MHz frequency region. Alternatively, the 5170 MHz to 5330 MHz frequency region/range may be divided into one channel through the 160 MHz frequency region.

Figure 20:
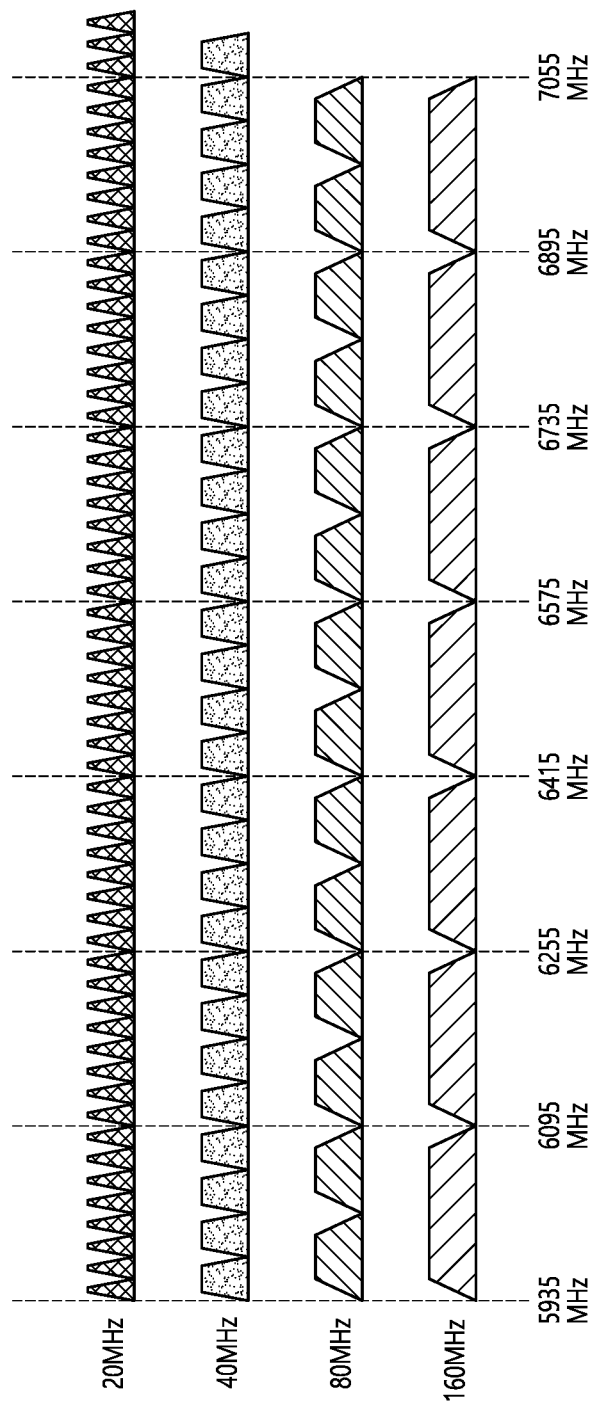
FIG. 20 illustrates an example of channels used/supported/defined in a 6 GHz band.

FIG. 20 illustrates an example of channels used/supported/defined in a 6 GHz band.

The 6 GHz band may be referred to by other names such as a third band. The 6 GHz band may refer to a frequency range in which channels having a center frequency of 5.9 GHz or higher are used/supported/defined. Specific numerical values illustrated in FIG. 20 may be changed.

For example, the 20 MHz channel of FIG. 20 may be defined from 5.940 GHz.

Specifically, the leftmost channel among the 20 MHz channels of FIG. 20 may have an index number #1 (or a channel index, a channel number, etc.) and a center frequency of 5.945 GHz may be allocated. That is, the center frequency of channel having the index #N may be determined as (5.940+0.005*N) GHz.

Accordingly, indexes (or channel numbers) of the 20 MHz channel of FIG. 20 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, and 233. In addition, according to the aforementioned (5.940+0.005*N) GHz rule, indexes of the 40 MHz channel of FIG. 20 may be 3, 11, 19, 27, 35, 43, 51, 59, 67, 75, 83, 91, 99, 107, 115, 123, 131, 139, 147, 155, 163, 171, 179, 187, 195, 203, 211, 219, and 227.

In the example of FIGS. 20, 20, 40, 80, and 160 MHz channels are shown, but additionally, a 240 MHz channel or a 320 MHz channel may be added.

Hereinafter, a concept of conventional channel bonding will be described.

For example, in the IEEE 802.11n system, 40 MHz channel bonding may be performed by combining two 20 MHz channels. In addition, 40/80/160 MHz channel bonding may be performed in the IEEE 802.11ac system.

For example, the STA may perform channel bonding on a primary 20 MHz channel (P20 channel) and a secondary 20 MHz channel (S20 channel). In the channel bonding process, a backoff count/counter may be used. A backoff count value may be selected as a random value and may be decreased during a backoff interval. In general, when the backoff count value becomes 0, the STA may attempt to access the channel.

The STA performing channel bonding determines whether S20 channel has been maintained in an idle state during a predetermined period (e.g., point coordination function interframe space (PIFS)) at a time point when P20 channel is determined to be idle during a backoff interval and a backoff count value for P20 channel is 0. If the S20 channel is idle, the STA may perform bonding on the P20 channel and the S20 channel. That is, the STA may transmit a signal (PPDU) through a 40 MHz channel (i.e., a 40 MHz bonding channel) including the P20 channel and the S20 channel.

Figure 21:
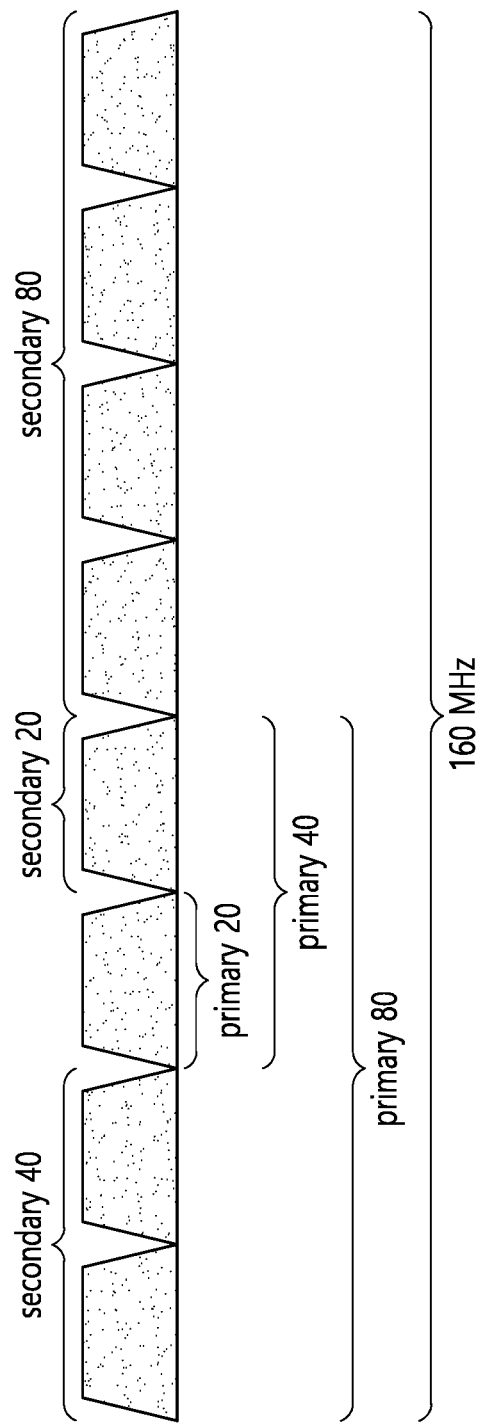
FIG. 21 illustrates an example of channel bonding.

FIG. 21 illustrates an example of channel bonding. As illustrated in FIG. 21, primary 20 MHz channel and secondary 20 MHz channel may configure a 40 MHz channel (primary 40 MHz channel) through channel bonding. That is, the bonded 40 MHz channel may include the primary 20 MHz channel and the secondary 20 MHz channel.

Channel bonding may be performed when a channel consecutive to the primary channel is idle. That is, primary 20 MHz channel, secondary 20 MHz channel, secondary 40 MHz channel, and secondary 80 MHz channel may be sequentially bonded. If the secondary 20 MHz channel is determined to be busy, channel bonding may not be performed even if other secondary channels are all idle. In addition, when it is determined that the secondary 20 MHz channel is idle and the secondary 40 MHz channel is busy, channel bonding may be performed only on the primary 20 MHz channel and the secondary 20 MHz channel.

Hereinafter, technical features of multilink and aggregation will be described.

The STA (AP and/or non-AP STA) of the present disclosure may support multilink communication. That is, the STA may simultaneously transmit and receive signals through a first link and a second link based on the multilink. That is, multilink may refer to a technique in which one STA simultaneously transmits and receives signals through multiple links. For example, transmitting a signal through one link and receiving a signal through another link may also be included in multilink communication. An STA supporting multilink may use multiple links in a first time period and may use only one link in a second time period.

Figure 22:
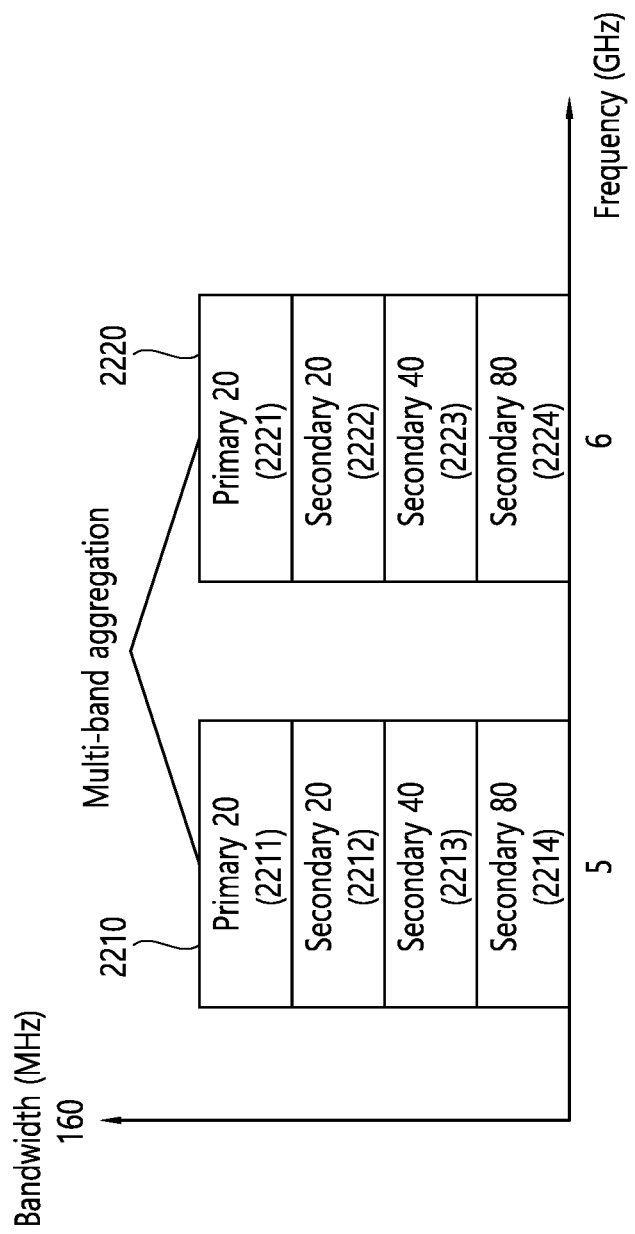
FIG. 22 illustrates technical features of links used in multilink.

FIG. 22 illustrates technical features of links used in multilink.

A link used in multilink may have at least one of the following technical features. Features related to links described below are exemplary, and additional technical features may be applied.

For example, each link used in multilink may be included in different bands. That is, when a multilink supporting first and second links is used, each of the first link and the second link may be included in a 2.4 GHz band, a 5 GHz band, or a 6 GHz band, but the first link and the second link may be included in different bands.

Referring to FIG. 22, a first link 2210 and a second link 2220 may be used for multilink. The first link 2210 of FIG. 22 may be included in, for example, a 5 GHz band. The second link 2220 of FIG. 22 may be included in, for example, a 6 GHz band.

Each link used in multilink may be included in the same band. For example, when multilink supporting first/second/third links are used, all links may be included in the same band, or the first/second links may be included in the first band and the third link is may be included in the second band.

The multilink may be configured based on different RF modules (e.g., a transceiver including an IDFT/IFFT/DFT/FFT block and a baseband processing device). Additionally or alternatively, multiple links included in the multilink may be discontinuous in the frequency region. That is, a frequency gap may exist in a frequency region corresponding to a first link and a frequency region corresponding to a second link, among the plurality of links.

As illustrated in FIG. 22, the first link 2210 may include a plurality of channels 2211, 2212, 2213, and 2214. The STA may apply existing channel bonding to the plurality of channels 2211, 2212, 2213, and 2214. That is, when the plurality of channels 2211, 2212, 2213, and 2214 are idle for a specific time period (e.g., during PIFS), the plurality of channels 2211, 2212, 2213, and 2214 may be configured as one bonding channel, and one bonding channel may operate as one link 2210. Alternatively, some (e.g., 2211, 2212, and 2214) of the plurality of channels 2211, 2212, 2213, and 2214 may operate as one link 2210 through a preamble puncturing technique newly proposed in the IEEE 802.11ax standard. The aforementioned features may be applied equally to the second link 2220.

An upper limit may be determined on the number of channels (and/or maximum bandwidth) included in one link used for multilink. For example, as in the example of FIG. 22, up to four channels may configure one link. Additionally or alternatively, a maximum bandwidth of one link may be 160 MHz, 240 MHz, or 320 MHz. Additionally or alternatively, one link may include only contiguous channels. The specific values above may be changed.

A procedure for identifying/specifying/determining a link used in multilink is related to an aggregation (or channel aggregation) procedure. The STA may aggregate multiple links to perform multilink communication. That is, the STA may perform 1) a first procedure for identifying/specifying/determining links aggregated for multilink and 2) a second procedure for performing multilink communication through the identified/specified/determined links. The STA may perform the first and second procedures as separate procedures or may simultaneously perform the first and second procedures through one procedure.

Hereinafter, technical features of the first procedure will be described.

The STA may transmit/receive information related to multiple links configuring multilink. For example, the AP may transmit identification information related to a band that supports capability of multilink and/or identification information related to a channel that supports capability of multilink through a beacon, a probe response, an association response, and other control frames. For example, when performing communication by aggregating some channels in the 5 GHz band and some channels in the 6 GHz band, the AP may transmit identification information related to channels that may be aggregated to the user STA.

For example, a user STA may transmit identification information related to a band that supports capability of multilink and/or identification information related to a channel that supports capability of multilink through a probe request, an association request, and other control frames. For example, when performing communication by aggregating some channels in the 5 GHz band and some channels in the 6 GHz band, the user STA may transmit identification information related to channels that may be aggregated to the AP.

Any one link among multiple links configuring multilink may operate as a primary link. The primary link may perform various functions. For example, when a backoff value of the primary link is 0 (and/or when the primary link is idle during PIFS), the STA may perform aggregation on another link. Information related to the primary link may also be included in the beacon, probe request/response, and association request/response.

The user-STA/AP may specify/determine/acquire a band and/or channel on which multilink is performed through a negotiation procedure for exchanging information related to each capability.

For example, the STA may specify/determine/acquire a first candidate band/channel that may be used for a first link, a second candidate band/channel that may be used for a second link, and a third candidate band/channel that may be used for a third link through a negotiation procedure.

Thereafter, the STA may perform a procedure for identifying/specifying/determining links aggregated for multilink. For example, the STA may aggregate at least two bands/channels based on a backoff count and/or a clear channel assessment (CCA) sensing result (busy/idle) of the first candidate band/channel, the second candidate band/channel, and the third candidate band/channel. For example, the STA may aggregate the second candidate band/channel maintained in the idle state for a specific period (during PIFS) at a time point when the backoff count value of the first candidate band/channel is 0. That is, the STA may determine/specify the first candidate band/channel as a first link for multilink and determine/specify the second candidate band/channel as a second link for multilink and perform multilink communication through the first and second links.

Hereinafter, technical features of the second procedure will be described.

For example, when the STA determines to aggregate the first and second links, the STA may perform multilink communication through the first and second links. For example, the STA may transmit PPDUs of the same length through both the first and second links. Alternatively, the STA may receive a transmission PPDU through the first link and receive a reception PPDU through the second link during an overlapping time period. The STA performs communication through all the aggregated links in a specific time period and may use only one link in another time period.

The STA (user-STA/AP) of the present disclosure may include a plurality of RF modules/units. For example, when the STA transmits a signal of a 2.4 GHz band using an RF module/unit for a 5 GHz and/or 6 GHz band, performance of the corresponding STA may be degraded. Thus, the STA may additionally include an RF module/unit for the 2.4 GHz band that is distinguished from the RF module/unit for the 5 GHz and/or 6 GHz band.

As described above, the STA of the present disclosure may operate in various bands/channels. Accordingly, an operation of delivering accurate information related to a band and/or channel should be defined for the user-STA/AP.

To this end, this disclosure proposes a number of embodiments.

In at least one (e.g., a first embodiment) of the following examples proposes, the AP notifies a neighboring STA about an ultra-wideband channel or a multi-band channel of 160 MHz or higher. Specifically, the present disclosure proposes an EHT operation element transmitted through a beacon frame, a probe response frame, or an association response frame. The EHT operation element proposed in this disclosure may have a format according to the IEEE 802.11be standard. The EHT operation element may support technical features described below.

Since at least one of the following examples (e.g., the first embodiment) relates to an example for indicating an ultra-wideband channel or a multi-band channel of 160 MHz or higher, the following technical features are not limited to the term EHT. That is, the term EHT may be changed/omitted, and the EHT operation element may be referred to as various terms such as a new type operation element or a first type operation element. For example, the following technical features may be applied to the EHT standard or to a new WLAN standard which has enhanced the IEEE 802.11be.

First Embodiment

For convenience of description, related technical features will be described based on the EHT operation element.

The AP (or transmitting STA) may define information related to an operating channel in a specific element. That is, the element may include information related to a channel in which the AP operates. The element may be included in a beacon frame periodically transmitted from the AP and transmitted to the STA. The STA may receive the beacon frame and identify information related to the operating channel of the AP. In addition, when the element is included in a probe response frame or an association response frame and the STA requests information related to a channel or connection from the AP, the element may be transmitted to the STA in response to the request.

In the IEEE 802.11n standard, 40 MHz channel information may be defined through the HT operation element. Further, in the IEEE 802.11ac standard, information related to the 80 MHz or 160 MHz channel may be defined through the VHT operation element. Since the IEEE 802.11ax standard does not explicitly define broadband channel transmission, the HE operation element may not include information related to the existing band channel. However, since the IEEE 802.11ax standard supports a 6 GHz band operation, the HE operation element may include information related to a channel in the 6 GHz band instead of information related to the existing band channel. An STA (e.g., EHT-STA) supporting a subsequent standard (e.g., IEEE 802.11be) after IEEE 802.11ax may support an ultra-wideband channel of 160 MHz or higher. In addition, the EHT-STA may transmit signals through channels in a plurality of bands (e.g., 2.4 GHz or 5 GHz) or transmit signals through a plurality of links. For example, one BSS may use a maximum 200 MHz channel by using a 40 MHz channel in the 2.4 GHz band and a 160 MHz channel in the 5 GHz band.

The AP and/or STA according to the present disclosure include four RF units and may operate in three bands of 2.4 GHz, 5 GHz, or 6 GHz. The number of RF units or the number of supported bands may be changed. According to an embodiment, the AP and/or STA may include four or more RF units. The AP and/or STA of the present disclosure may operate in at least one of 2.4 GHz, 5 GHz, 6 GHz, 60 GHz, or 900 MHz and may operate in other bands.

This disclosure relates to a situation in which several channels are supported in one BSS. In this case, the STA may transmit/receive signals through one or a plurality of channels. That is, within the BSS, the AP and/or STA may support a plurality of channels. The STA may transmit a signal through at least one of a plurality of channels supported by the AP. At least one of the plurality of channels may be referred to as various expressions such as a link, a session, or a connection.

The EHT operation element may include operating channel information of the AP. The EHT operation element may include information related to at least one channel in the first band in which the EHT standard is supported. The VHT operation element may include information related to at least one channel in the second band in which the VHT standard is supported. The HT operation element may include an HT operation element including information related to at least one channel in a third band in which the HT standard is supported. According to an embodiment, the first band may include the 6 GHz band described above. The second band may include the 5 GHz band described above. The third band may include the 2.4 GHz band described above.

According to an embodiment, when the BSS operates in the 5 GHz and 6 GHz bands, the HT operation element may include channel information of 40 MHz in 5 GHz (e.g., information related to the primary 20 channel and the secondary 20 channel). The VHT operation element may include channel information of 80 MHz or 160 MHz in 5 GHz. The EHT operation element may include channel information in the 6 GHz band. For example, if the AP (or transmitting STA) uses channel #42 (80 MHz) and channel #155 (80 MHz) in the 5 GHz band and channel #7 (80 MHz) in the 6 GHz band, channel #7 information in the 6 GHz band may be included in the EHT operation element. Since the VHT-STA and HE-STA may operate in a channel of the 5 GHz band of the corresponding BSS, the VHT operation element may include channel information in the 5 GHz band in which the VHT-STA and HE-STA will operate. Accordingly, information related to two channels (channel #42 and channel #155) in the 5 GHz band may be included in the VHT operation element. Since the HT-STA may operate in the 40 MHz channel of the 5 GHz band of the corresponding BSS, the HT operation element may include information related to a band in which the HT-STA may operate. The HT operation element may include information related to the primary 20 MHz channel and the primary 40 MHz channel of the 5 GHz band in which the HT-STA will operate.

In order to ensure backward compatibility with the legacy STA, the EHT-STA may transmit the HT operation element and the VHT operation element together with the EHT operation element. Accordingly, the EHT-STA may include only information not included in the HT operation element and the VHT operation element in the EHT operation element and transmit the same to another STA. The EHT-STA may transmit information that does not overlap with the HT operation element and the VHT operation element in the EHT operation element. Accordingly, overhead may be reduced.

Figure 23:
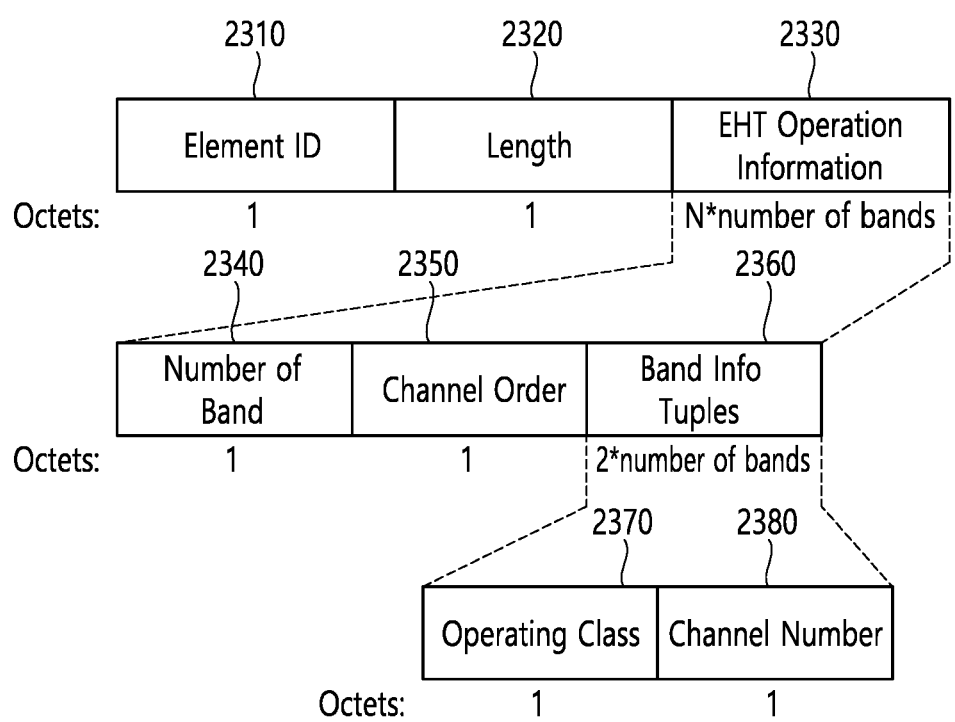
FIG. 23 illustrates a first format of an EHT operation element.
Figure 24:
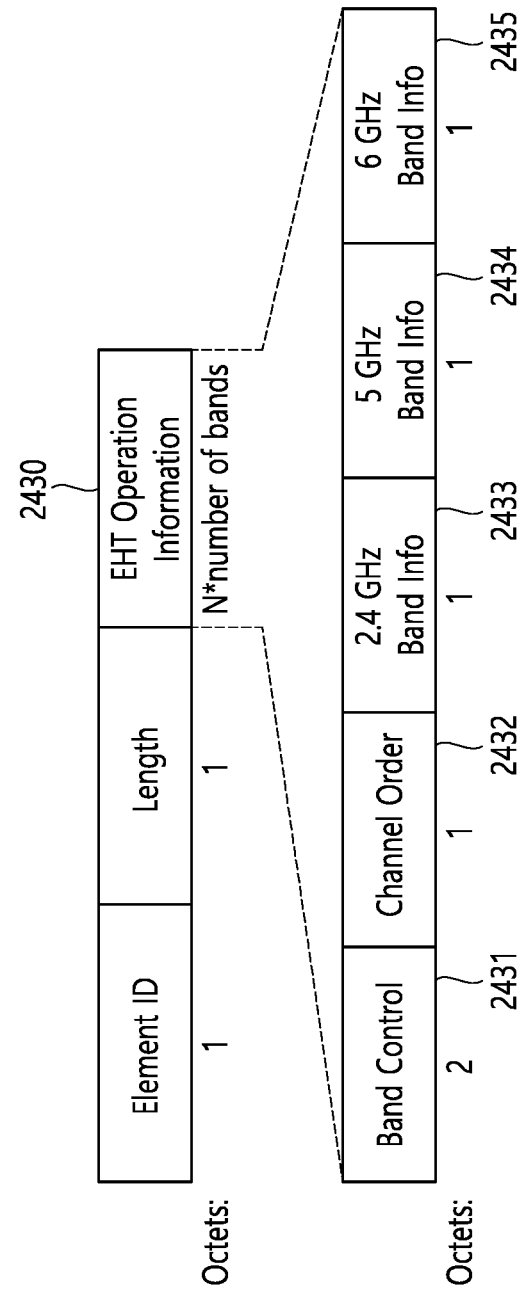
FIG. 24 illustrates a second format of the EHT operation element.

FIG. 23 may illustrate a first format of the EHT operation element, and FIG. 24 may illustrate a second format of the EHT operation element. FIG. 23 may be a format for defining information related to a band or RF not included in an operation element (e.g., VHT operation element or HT operation element) according to a conventional standard by band or RF. FIG. 24 may be a format for defining information related to all bands or RFs not included in the operation element according to the conventional standard.

FIG. 23 illustrates a first format of the EHT operation element.

Specifically, the EHT operation element may include an Element ID field 2310, a Length field 2320, or an EHT Operation Information field 2330. The Element ID field 2310 may include information related to an Element ID. The Length field 2320 may include information related to the number of octets after the Length field 2320.

The EHT Operation Information field 2330 may include a Number of Band field 2340, a Channel Order field 2350, and/or a Band Info Tuples field 2360.

The Number of Band field 2340 may include information related to the number of bands or RFs not included in the VHT operation element among a total number of bands or RFs of the BSS. For example, the AP may use channel #42 (80 MHz) and channel #155 (80 MHz) in the 5 GHz band and channel #7 (80 MHz) in the 6 GHz band. The VHT operation element may include information related to channel #42 and channel #155 in the 5 GHz band. Accordingly, the EHT operation element may include only information related to one channel 7 in the 6 GHz band. The Number of Band field 2340 in the EHT Operation Information field 2330 may have a first value (e.g., {1}).

The Channel Order field 2350 may include information related to a position of a primary channel. The Channel Order field 2350 may indicate information related to the position of the primary channel through various methods. For example, the Channel Order field 2350 may indicate a primary 20 MHz channel in 160 MHz channel through a bitmap.

The Band Info Tuples field 2360 may include information related to each band or RF. Specifically, the Band Info Tuples field 2360 may be repeatedly configured to indicate information related to a band or RF, excluding channel information included in the VHT operation element. For example, the AP may transmit information related to two RFs through the EHT operation element, excluding channel information included in the VHT operation element. Therefore, the Band Info Tuples field 2360 may be configured repeatedly twice.

The Band Info Tuples field 2360 may include an Operating Class subfield 2370 or a Channel Number subfield 2380.

The Operating Class subfield 2370 may include information related to an Operating Class of each band or RF. An index indicating one of the sets of rules applied to a wireless device may be defined to correspond to one Operating Class. For example, one set of rules may include a channel starting frequency, a channel spacing, a channel set, and a behavior limit set. The Operating Class may be set to be different for each country. For example, the AP may use channel #42 (80 MHz) and channel #155 (80 MHz) in the 5 GHz band and channel #7 (80 MHz) in the 6 GHz band. The VHT operation element may include information of Operating Class indicating channel #42 and channel #155 in the 5 GHz band. Therefore, the Operating Class subfield 2370 in the Band Info Tuples field 2360 may have a value (e.g., {133}) for indicating the 80 MHz channel in the 6 GHz band.

The channel number subfield 2380 may include information related to a channel number of each band or RF. For example, the AP may use channel #42 (80 MHz) and channel #155 (80 MHz) in the 5 GHz band and channel #7 (80 MHz) in the 6 GHz band. The VHT operation element may include information related to channel #42 and channel #155 in the 5 GHz band. Accordingly, the Channel Number subfield 2380 in the Band Info Tuples field 2360 may have a value (e.g., {7}) for indicating channel #7.

FIG. 24 illustrates a second format of the EHT operation element.

The EHT operation element may include operating channel information of the AP.

Unlike the first format illustrated in FIG. 23, the second format may be a format for defining information related to all bands or RFs not included in the VHT operation element.

An EHT Operation Information field 2430 may include a Band Control field 2431, Channel Order field 2432, 2.4 GHz Band Info field 2433, 5 GHz Band Info field 2434, or 6 GHz Band Info field 2435.

The Band Control field 2431 may include information related to a band or RF of the current BSS, excluding channel information included in the VHT operation element. The Band Control field 2431 may include information related to a combination of a band or RF in the 2.4 GHz, 5 GHz and/or 6 GHz, excluding channel information included in an operation element according to a conventional standard. For example, when the BSS operates in up to 4 RFs and 3 bands, there may be about 50 combinations of bands or RFs. A value of the Band Control field 2431 may be configured as a lookup table according to the combination of the bands or RFs. For example, the value of the Band Control field 2431 may consist of 8 bits. When the value of the Band Control field 2431 is {2}, i.e., {00000010}, it may indicate that there are two RFs for the 5 GHz band and two RFs for the 6 GHz band. According to an embodiment, the AP may transmit a mapping relationship between RFs and bands to the receiving STA through the Band Control field 2431. The receiving STA may determine an optimal RF-band mapping relationship for communication with the AP based on the mapping relationship between the bands and the RFs received from the AP.

The Channel Order field 2432 may include information related to a position of the primary channel. The primary channel may refer to a specific frequency region in which a beacon (or other control frame) may be transmitted. The Channel Order field 2432 may include information related to the position of the primary channel through various methods. For example, the Channel Order field 2432 may indicate a Primary 20 MHz Channel in the 160 MHz through a bitmap.

The 2.4 GHz Band Info field 2433 may include information related to the 2.4 GHz band. Specifically, the 2.4 GHz Band Info field 2433 may include information related to a channel number and information related to a channel width in the 2.4 GHz band.

The 5 GHz Band Info field 2434 may include information related to the 5 GHz band. Specifically, the 5 GHz Band Info field 2434 may include information related to a channel number and information related to a channel width in the 5 GHz band.

The 6 GHz Band Info field 2435 may include information related to the 6 GHz band. Specifically, the 6 GHz Band Info field 2435 may include information related to a channel number and information related to a channel width in the 6 GHz band.

The information related to the channel number included in the 2.4 GHz Band Info field 2433, the 5 GHz Band Info field 2434, and the 6 GHz Band Info field 2435 may include information related to a center frequency and a channel width (or frequency region (e.g., 20 MHz)) as described above with reference to FIGS. 9 and 10. However, the information related to the channel number may be defined to be different for each country and may not include information related to the channel width. Therefore, the 2.4 GHz Band Info field 2433, the 5 GHz Band Info field 2434, and the 6 GHz Band Info field 2435 may additionally include information related to a channel width, as well as information related to a channel number.

According to an embodiment, the second format of the EHT operation element may further include information related to an operating class in order to transmit information related to a channel-related regulation (e.g., TX power).

Hereinafter, another format of the EHT operation element will be described.

Unlike FIGS. 23 and 24, the EHT operation element may include all operating channel information of the AP. For example, if the AP is using channel #42 (80 MHz) and channel #155 (80 MHz) in the 5 GHz band and channel #7 (80 MHz) in the 6 GHz band, the EHT operation element may include all information related to three 80 MHz channels (a total of 240 MHz) and two bands (5 GHz and 6 GHz).

The VHT operation element may include information related to a band in which the VHT-STA and the HE-STA may operate. Therefore, the VHT operation element may include an overlapped part of the information included in the EHT operation element.

Since the EHT operation element may be newly configured separately from the VHT operation element or the HT operation element, all combinations of bands or RFs that may operate in the EHT-STA may be supported. For example, when the AP uses three 80 MHz channels in the 5 GHz band or three bands of 2.4 GHz, 5 GHz, and 6 GHz, the AP may indicate information related to all the channels through the EHT operation element.

Figure 25:
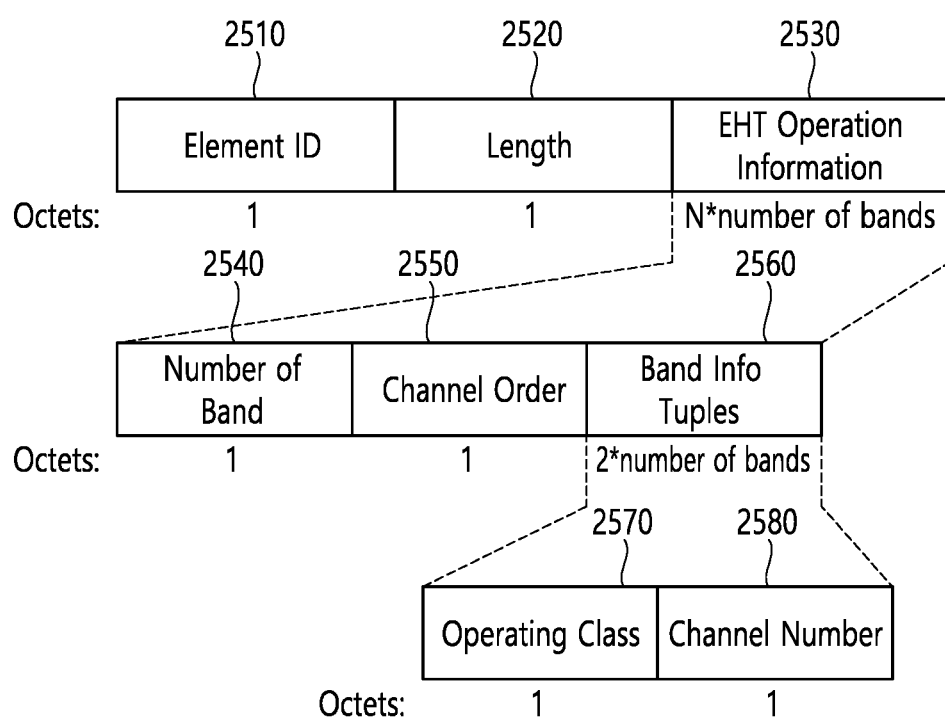
FIG. 25 illustrates a third format of the EHT operation element.
Figure 26:
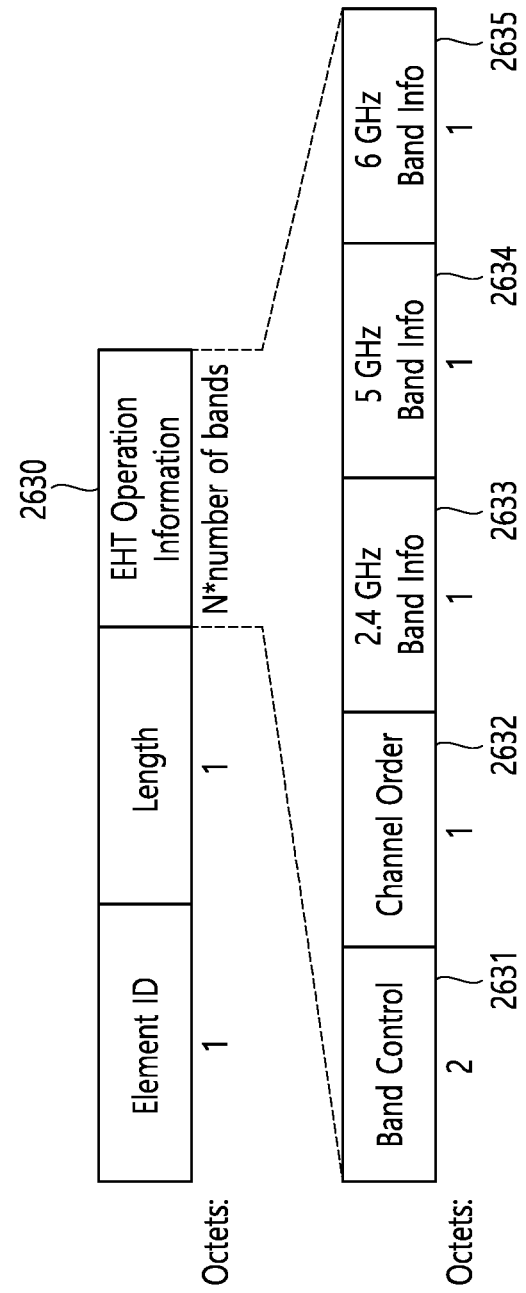
FIG. 26 illustrates a fourth format of the EHT operation element.

FIG. 25 may illustrate a third format of the EHT operation element, and FIG. 26 may illustrate a fourth format of the EHT operation element. FIG. 25 may be a format for defining information related to a band or RF by band or RF. FIG. 26 may be a format for defining information related to all bands or RFs at once.

FIG. 25 illustrates the third format of the EHT operation element.

Specifically, the EHT operation element may include an Element ID field 2510, a Length field 2520, or an EHT Operation Information field 2530. The Element ID field 2510 may include information related to an element ID. The Length field 2520 may include information related to the number of octets after the Length field 2520.

The EHT Operation Information field 2530 may include a Number of Band field 2540, a Channel Order field 2550, or a Band Info Tuples field 2560.

The Number of Band field 2540 may include information related to the number of all bands or all RFs of the BSS. For example, the AP may use channel #42 (80 MHz) and channel #155 (80 MHz) in the 5 GHz band and channel #7 (80 MHz) in the 6 GHz band. Since channel #42 and channel #155 are not contiguous in the 5 GHz band, it may be desirable for the AP to include two RFs. In addition, in order to transmit a signal of channel #7 in the 6 GHz band, the AP may include an additional RF. That is, the AP may include a total of three RFs. Accordingly, the Number of Band field 2540 in the EHT Operation Information field 2530 may have a first value (e.g., {3}).

The Channel Order field 2550 may include information related to a position of a primary channel. The Channel Order field 2550 may indicate information related to the position of the primary channel through various methods. For example, the Channel Order field 2550 may indicate a primary 20 MHz channel in the 250 MHz through a bitmap.

The Band Info Tuples field 2560 may include information related to the number of each of the bands or RFs. Specifically, the Band Info Tuples field 2560 may be repeatedly configured to indicate information related to the total number of bands or RFs. For example, the AP may use channel #42 (80 MHz) and channel #155 (80 MHz) in the 5 GHz band and channel #7 (80 MHz) in the 6 GHz band. The AP may require three RFs to use channel #42 and channel #155 in the 5 GHz band and channel #7 in the 6 GHz band. Therefore, the Band Info Tuples field 2560 may be configured repeatedly three times.

The Band Info Tuples field 2560 may include an Operating Class subfield 2570 or a Channel Number subfield 2580.

The operating class subfield 2570 may include information related to an operating class of each band or RF. For example, the AP may use channel #42 (80 MHz) and channel #155 (80 MHz) in the 5 GHz band and channel #7 (80 MHz) in the 6 GHz band. The AP may require three RFs to use channel #42 and channel #155 within the 5 GHz band and channel #7 in the 6 GHz band. Therefore, the Band Info Tuples field 2560 may be configured repeatedly 3 times. The Band Info Tuples field 2560 may include a first Band Info Tuples field, a second Band Info Tuples field, and a third Band Info Tuples field. Accordingly, a first Operating Class subfield in the first Band Info Tuples field including the information related to channel 42 may have a value (e.g., {128}) for indicating the 80 MHz channel in the 5 GHz band. A second Operating Class subfield in the second Band Info Tuples field including the information related to channel #155 may have a value (e.g., {128}) for indicating the 80 MHz channel in the 5 GHz band. A third Operating Class subfield in the third Band Info Tuples field including the information related to channel #7 may have a value (e.g., {133}) for indicating the 80 MHz channel in the 6 GHz band.

The Channel Number Subfield 2580 may include information related to a channel number of each band or RF. For example, the AP may use channel #42 (80 MHz) and channel #155 (80 MHz) in the 5 GHz band and channel #7 (80 MHz) in the 6 GHz band. The Band Info Tuples field 2560 may include a first Band Info Tuples field, a second Band Info Tuples field, and a third Band Info Tuples field. Accordingly, a first channel number subfield in the first Band Info Tuples field may have a value (e.g., {42}) for indicating channel #42 in the 5 GHz band. A second channel number subfield in the second Band Info Tuples field may have a value (e.g., {155}) for indicating channel #155 in the 5 GHz band. A third channel number subfield in the third Band Info Tuples field may have a value (e.g., {7}) for indicating channel #7 in the 6 GHz band.

FIG. 26 illustrates a fourth format of the EHT operation element.

The EHT operation element may include operating channel information of the AP. Unlike the third format shown in FIG. 25, the fourth format may be a format for defining information related to all bands or RFs at once.

An EHT Operation Information field 2630 may include a Band Control field 2631, Channel Order field 2632, 2.4 GHz Band Info field 2633, 5 GHz Band Info field 2634, or 6 GHz Band Info field 2635.

The Band Control field 2631 may include information related to a band or RF of the current BSS. The Band Control field 2631 may include information related to a combination of bands or RFs in 2.4 GHz, 5 GHz, or 6 GHz. For example, when the BSS operates in up to 4 RFs and 3 bands, there may be about 100 combinations of bands or RFs. A value of the Band Control field 2631 may be configured as a lookup table according to a combination of the bands or RFs. For example, a value of the Band Control field 2631 may consist of 8 bits. When the value of the Band Control field 2631 is {1}, i.e., {00000001}, it may indicate that there are two RFs for the 5 GHz band and two RFs for the 6 GHz band. As another example, when the value of the Band Control field 2631 is {5}, i.e., {00000101}, it may indicate that there are 1 RF for the 5 GHz band and 3 RFs for the 6 GHz band.

The Channel Order field 2632 may correspond to the Channel Order field 1532 of FIG. 24.

The 2.4 GHz Band Info field 2633, the 5 GHz Band Info field 2634, and the 6 GHz Band Info field 2635 may correspond to the 2.4 GHz Band Info field 2433, the 5 GHz Band Info field 2434, and the 6 GHz Band Info field 2435 of FIG. 24, respectively.

Second Embodiment

The second embodiment of the present disclosure is a technique for transmitting information related to channels in multiple bands transmitted through the first embodiment based on a multi-band element proposed in the legacy IEEE 802.11ad standard.

FIG. 27 illustrates an example of a multi-band element based on the legacy IEEE 802.11ad standard. The format of FIG. 27 is related to a fast session transfer (FST) function of the IEEE 802.11ad standard. The FTS function is a function that quickly switches a session in a 60 GHz band to a 2.4 GHz and/or 5 GHz band (or in the opposite direction).

For example, when the STA operates in three bands of 2.4 GHz, 5 GHz, and 6 GHz, the above three bands may be easily identified by fields improved as follows.

Among the fields of FIG. 27, Element ID 2710 and Length Field 2720 may be omitted.

Band ID 2730 of FIG. 27 may include identification information for identifying multiple bands applied to an RF module/unit of the STA.

Operating Class 2740 of FIG. 27 may include information related to a channel width and a center frequency.

Channel Number 2750 of FIG. 27 indicates the number of channels based on the Operating class.

However, it may be difficult to deliver sufficient information related to the operating band/channel of an AP with only the three fields presented above. Thus, the following additional information may be used.

For example, the channel order 2350, 2432, 2550, or 2632 used in FIGS. 23 to 26 may be transmitted together with the example of FIG. 27.

In addition, the Number of band 2340 or 2540 used in FIGS. 23 and 25 may be transmitted together with the example of FIG. 27.

The method of including the additional information (i.e., Channel order and Number of band) defined above in a Beacon, Probe Response frame, Association Response frame, etc. may be based on the following method. First, a field of FIG. 27 may be utilized. Among the fields of FIG. 27, a reserved bit exists in the Multi-band Control 2760. Using one of these bits, when the corresponding bit is 1, it may indicate that several fields of the multi-band are used for different purposes. For example, when the reserved bit is 1, BSSID 2770 and Beacon Interval field 2780 may be used as a Channel Order and Number of band. Unlike the above technique, it is possible to newly define the EHT operation element and to include Channel Order and Number of band in the corresponding element without using some of the fields of FIG. 27.

Meanwhile, adding to a 6 GHz operation in the IEEE 802.11ax is under discussion. Accordingly, a 6 GHz operation Information field may be included in the HE operation element for the IEEE 802.11ax. The corresponding field may include 1) a primary channel position, 2) a channel width, 3) a channel number, and/or 4) information related to a distance between channels in case of a non-contiguous channel of 80 MHz+80 MHz.

If the HE operation element additionally includes a 6 GHz Operation Information field, the STA may support ultra-wideband multi-band transmission. Accordingly, the AP may support, for example, two channels, i.e., a 160 MHz channel included in the 5 GHz band and a 160 MHz channel included in the 6 GHz band. In this case, the AP may signal information related to the channel in the 5 GHz band through the VHT operation element and may signal information related to the channel in the 6 GHz band through the HE operation element. In this case, however, an appropriate operation may not be performed. That is, when the 6 GHz Operation Information field is added, an accurate operation may not be possible in some cases. For example, an accurate operation may not be possible when two 160 MHz channels are used in the 5 GHz band, when three or four 80 MHz channels are used in the 5 GHz band, and in case of operating in three bands of 2.4 GHz, 5 GHz, and 6 GHz.

Therefore, the present disclosure proposes to include the following additional information in the EHT operation element in the case of adding the 6 GHz Operation Information field to the HE operation element. That is, the following suggestion is related to a method of providing information related to an operating channel by the AP as much as possible in the HT operation element, VHT operation element, and HE operation element and providing only necessary additional information in the EHT operation element, as in the example of FIGS. 23 and 24 described above.

For example, in the case of using two 160 MHz channels in the 5 GHz band, the EHT operation element may be configured as follows. For example, the EHT operation element may include information related to an Operation Class (i.e., an operating class), a Channel number, and/or a Channel order. In this case, the information related to the Operation Class may include operating class information of a channel that is not provided in the HT/VHT/HE operation element. The corresponding information may provide center frequency and channel width information. In the above example, since it is the 160 MHz channel in the 5 GHz band, the Operating Class value may be determined as 129. Also, Channel number may inform a position of the corresponding channel. In addition, the information related to the channel order may be set in the same manner as the channel order 2350, 2432, 2550, or 2632 used in FIGS. 23 to 26. The above information may be included several times depending on a situation to provide additional channel information.

Third Embodiment

The third embodiment described below relates to technical features that may be performed together with the first and/or second embodiments. For example, while at least one of a plurality of fields of FIGS. 23 to 26 described in the first embodiment is transmitted/received, information described below may be transmitted/received together. Further, for example, while at least one of the information fields of FIG. 27 described in the second embodiment is transmitted/received, information described below may be transmitted/received together.

That is, while information related to a band (e.g., 2.4 GHz, 5 GHz, and/or 6 GHz band) in which the AP and/or the user STA operates and a channel (e.g., at least one 20/40/80/160/240/320 MHz channel) included in the corresponding band is transmitted/received through the aforementioned example (e.g., at least one of the examples of FIGS. 23 to 27), additional information below may be transmitted and received together.

The third embodiment of the present disclosure may relate to information additionally transmitted based on the first and second embodiments.

The following example may be performed by the AP/user-STA that aggregates multiple links and performs transmission through the multiple links.

As a first example, the AP/user-STA may transmit first information related to a preferred link. The preferred link may be, for example, information related to a band (or a 20/40/80/160/240/320 MHz channel included in the band) preferred by the AP/user-STA.

For example, when the first information includes identification information related to a band (e.g., 2.4 GHz, 5 GHz, 6 GHz, etc.) preferred by the AP/user-STA, specific technical features regarding the first information may be as follows.

Preferred band: The user-STA or AP may transmit information related to a preferred band/link together, when transmitting a network management related signal (e.g., Beacon, Probe Request, Probe Response, Association Request, Association Response including some of the features of FIGS. 23 to 27).

Even if the user-STA and/or AP performs communication based on multiple links (e.g., multiple bands), it is not necessary for a MAC signal for network management defined/generated/decoded in the IEEE 802.11 MAC layer to be transmitted based on a plurality of links (e.g., a plurality of bands). An example of the MAC signal for network management defined/generated/decoded in the IEEE 802.11 MAC layer may include field/frame/packet for Block Ack agreement, target wake time setup (TWT), operating mode (OM) indication, and TIM broadcast. It may be preferred to transmit the aforementioned MAC signal through only one link (e.g., one band). When the aforementioned MAC signal is transmitted through multilink, transmission of user data (e.g., data generated/decoded in the higher layer of the MAC, rather than the MAC signal) may be delayed or processing of the MAC signal may be delayed due to transmission of user data.

Accordingly, the user-STA/AP may include information related to a band (or a preferred channel within a corresponding band) preferred for the MAC (management) signal, while transmitting/receiving information related to a link (e.g., a band and/or a channel in the band) on which the user-STA/AP operates based on the aforementioned first and second embodiments.

Alternatively, the user-STA/AP may include information related to a band/link preferred for user data (e.g., data generated/decoded in a higher layer of MAC, rather than MAC signal), instead of information related to a band/link preferred for a MAC (management) signal, in the first information. For example, in a situation where the user-STA/AP supports two links, when a specific first link/band is preferred for the MAC signal, another second link/band may be determined as a preferred link for the user data.

The example described above will be described in more general terms as follows.

The first STA, which is the user-STA or the AP, may transmit a first information related to a preferred link to a second STA. The first information related to the preferred link may be information for identifying a preferred band (e.g., any one of 2.4/5/6 GHz band) and/or a specific channel included (e.g., 20/40/80/160/240/320 MHz channel) included in a specific band.

The first information may include at least one of first preferred link information related to a preferred link for communication of user data (e.g., data generated/decoded in a higher layer of the MAC, rather than a MAC signal) of the first STA and second preferred link information related to a preferred link for management signaling of the first STA. An example of the management signaling described above may include a field/frame/packet for a Block Ack agreement, a Target Wake Time (TWT) setup, an Operating Mode (OM) indication, and TIM broadcast and may be generated/decoded in the MAC layer of the STA.

The first information may be transmitted and received in a negotiation procedure between the first/second STAs. That is, after the information related to the preferred band/link of the first STA is transmitted to the second STA and the information related to the preferred band/link of the second STA is transmitted to the first STA, information related to the band/link used for user data or management signaling in the STA may be finally determined through a negotiation procedure.

The first information may be included in Beacon, Probe Request, Probe Response, Association Request, Association Response, and the like. Hereinafter, technical features of the second information that may be transmitted in addition to the first information or separately from the first information will be described. For example, the second information may be information related to band sharing capability. That is, the second information may be information related to whether signals may be shared in multiple links. That is, the second information may be information related to whether the STA may transmit the first signal generated for the first link through the second link. Hereinafter, the technical features of the second information or information related to the band sharing capability will be described.

Band sharing capability: The user-STA or AP may transmit information related to band sharing capability together, when transmitting the network management-related signal (e.g., Beacon, Probe Request, Probe Response, Association Request, Association Response including some of the features of FIGS. 23 to 27).

When performing transmission/reception through multiple links/bands, the User-STA or AP may transmit information (i.e., information related to band sharing capability) on whether signals may be shared in multiple links/bands. The information related to such band sharing capability (or link sharing capability) may be composed of an N-bit field and may have different values as follows.

The first value of band sharing capability information (or link sharing capability information)

When the user-STA or the AP has the following capabilities, the second information (information related to the band sharing capability) may have a first value. Specifically, 1) when a signal for user data communication may be shared and 2) a signal for management signaling may be shared in the STA, the second information may have the first value.

For example, a case where a signal for user data communication may be shared in an STA may be a case where user data may be shared in a multilink (or multiband) of the STA. For example, after communicating user data through a first link/band aggregated by the STA, if the user data may be retransmitted through a second link/band (second link/band aggregated by the STA), it may be determined that a signal for user data communication may be shared in the STA. That is, the STA may perform retransmission for the transmission data through the second link if the ACK is not received through the first link for the transmission data for the first link. In this case, it may be determined that a signal for user data communication may be shared in the STA. The STA may configure a common memory or queue for the first/second link/band and share user data for the multilink/band. Alternatively, the STA may share the user data for multilink/band by configuring a first memory (or queue) for the first link/band and configuring a second memory (or queue) for the second link/band. Meanwhile, when the user data is shared in the multilink/band of the STA, it is possible to transmit user data (or user data having the same Priority/QoS) having the same TID (Traffic ID) through different links/bands.

For example, a case where a signal for management signaling may be shared in the STA is a case where management information may be shared for a multilink/band. For example, when first control information for the first link/band aggregated by the STA is also applied to the second link/band aggregated by the STA, It may be determined that management information may be shared for the multilink/band. For example, information related to a target wake time (TWT) for the first link/band, information related to an operating mode indication (OMI), information related to an ACK/NACK policy, and information related to a management protocol defined in the MAC layer may be shared in the multilink/band. The TWT-related information is information related to TWT defined in the legacy IEEE 802.11ax standard and may include various information such as information related to a reception time of a beacon related to TWT, information related to a transmission time of a trigger frame related to TWT, information related to a TWT service period (SP), information related to a time period in which the information related to the TWT is valid, and the like. The information related to OMI may include information related to a maximum RX/TX bandwidth applied to a specific band/link, the number of maximum RX/TX spatial streams, information related to whether UL-MU communication is supported, information related to whether extended range (ER) SU communication is supported, information related to whether UL-MU communication is supported for user data communication, and the like.

The second value of band sharing capability information

If the user-STA or the AP has the following capabilities, the second information (information related to the band sharing capability) may have a second value.

Specifically, 1) when the signal for user data communication may be shared within the STA but 2) the signal for management signaling cannot be shared in the STA, the second information may have a second value (or 2A value). Alternatively, 1) when the signal for user data communication cannot be shared but 2) the signal for management signaling may be shared, the second information may have a second value (or 2B value).

For example, the STA may transmit data having a pre-set TID only through a pre-set band/link. In this case, it may be preferred for the corresponding STA to apply the aforementioned management information (e.g., TWT/OMI/ACK and/or other MAC layer information) to multiple bands/links. The STA may set band sharing capability information to a second value.

According to another example, when the STA prefers to performing user data transmission regardless of band/link and prefers to separately applying the MAC protocol according to bands/links, the corresponding STA may set the band sharing capability information to the second value.

Third value of band sharing capability information

When the user-STA or the AP does not have the aforementioned capability, the band sharing capability information may be set to a third value. That is, information exchange is not performed on the multilink aggregated for the STA, and a separate operation may be performed. In this case, a separate association procedure may be performed on the multiple links aggregated for the STA or a separate MAC address may be configured for each link.

The second information may be transmitted and received in a negotiation procedure between the first and second STAs. That is, after the information related to the band sharing capability information of the first STA is transmitted to the second STA and the information related to the band sharing capability information of the second STA is transmitted to the first STA, information related to the band/link used in the first/second STAs may be finally determined through the negotiation procedure.

The second information may be included in Beacon, Probe Request, Probe Response, Association Request, Association Response, and the like.

The aforementioned technical features may be implemented as an example of FIG. 28.

FIG. 28 illustrates an example of a frame including first and second information.

The example of FIG. 28 may be used together with some fields (or all fields) illustrated in the frame of FIG. 27. For example, the fields 2810 and 2820 illustrated in FIG. 28 may be included in the same frame together with some of or all fields illustrated in FIG. 27.

As illustrated in FIG. 28, the Preferred link/band field 2810 may include the aforementioned first information. For example, the Preferred link/band field 2810 of FIG. 28 may include identification information related to a specific link and/or band preferred by a MAC signal. Additionally or alternatively, the preferred link/band field 2810 of FIG. 28 may include identification information related to a specific link and/or band in which user data communication is preferred. Additionally or alternatively, the Preferred link/band field 2810 of FIG. 28 may include 1) identification information related to a specific link and/or band and 2) a type of communication preferred for the corresponding link/band (e.g., user data communication or MAC signal) together.

As illustrated in FIG. 28, the Sharing Capability field 2820 may include the aforementioned second information. For example, the Sharing Capability field 2820 of FIG. 28 may include information related to the aforementioned Band sharing capability or Link Band sharing capability. As described above, both user data communication and management signaling may be shared in a plurality of specific bands/links. In this case, the Sharing Capability field 2820 may have a first value. In addition, only one of user data communication or management signaling may be shared in the plurality of specific bands/links. In this case, the Sharing Capability field 2820 may have a second value. In addition, neither user data communication nor management signaling may be shared in the plurality of specific bands/links. In this case, the Sharing Capability field 2820 may have a third value. In addition to the first to third values described above, additional information may be included in the Sharing Capability field 2820. For example, identification information for identifying multiple bands/ranks to which the Sharing Capability field 2820 is applied may be additionally included.

Figure 29:
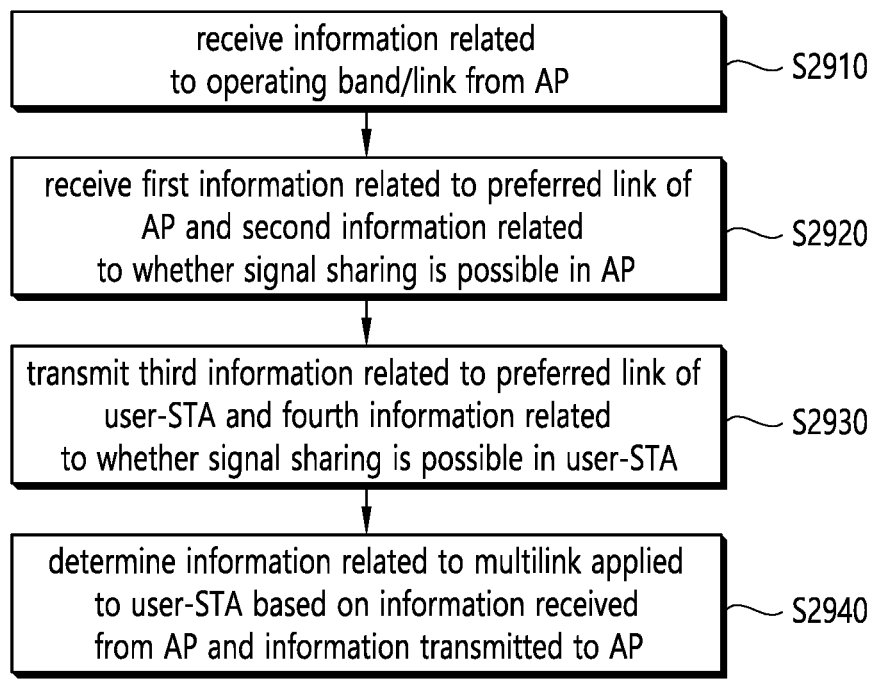
FIG. 29 is a flowchart of a procedure performed by a user station (STA).

FIG. 29 is a flowchart of a procedure performed in a user STA.

Each step illustrated in FIG. 29 illustrates a specific example of an operation performed by a user STA, and the user STA may perform only some of the operations of FIG. 29. Accordingly, not all the examples of FIG. 29 are essential operations, and the user STA may omit/modify some of the operations of FIG. 29.

As illustrated in step S2910, the user-STA may receive information related to an operating band/link from an AP. The information related to the operating band/link may be information related to a 2.4/5/6 GHz band and a channel (20/40/80/160/240/320 MHz) included in the corresponding band. The information received through step S2910 may include the technical features described in FIGS. 23 to 27 included in the first/second embodiments described above.

As illustrated in step S2920, the user-STA may receive first information related to a preferred link of the AP and second information related to whether signal sharing is possible in the AP. In the aforementioned third embodiment, an example of transmitting capability information related to a preferred link/band has been described. The capability information related to the preferred link/band of the AP may be included in the first information in step S2920. In addition, in the aforementioned third embodiment, an example of transmitting information related to band sharing capability has been described. Information related to the band sharing capability of the AP may be included in the second information of step S2920.

As illustrated in step S2930, the user-STA may transmit third information related to the preferred link of the user-STA and fourth information related to whether signal sharing is possible in the AP. The capability information related to the preferred link/band according to the third embodiment may be included in the third information in step S2930, and the information related to the band sharing capability according to the third embodiment may be included in the fourth information in step S2930.

As illustrated in step S2940, the user-STA may determine information related to multilink applied to the user-STA based on information received from the AP and information transmitted to the AP. That is, the user-STA may negotiate information related to an operating band/link, a preferred band/link, and information related to band sharing capability with the AP, and then perform communication with the AP based on a negotiation result. That is, a configuration of the operating band/link of the user-STA, whether to perform band sharing in a specific band/link, etc. may be determined based on the result of negotiation with the AP.

Figure 30:
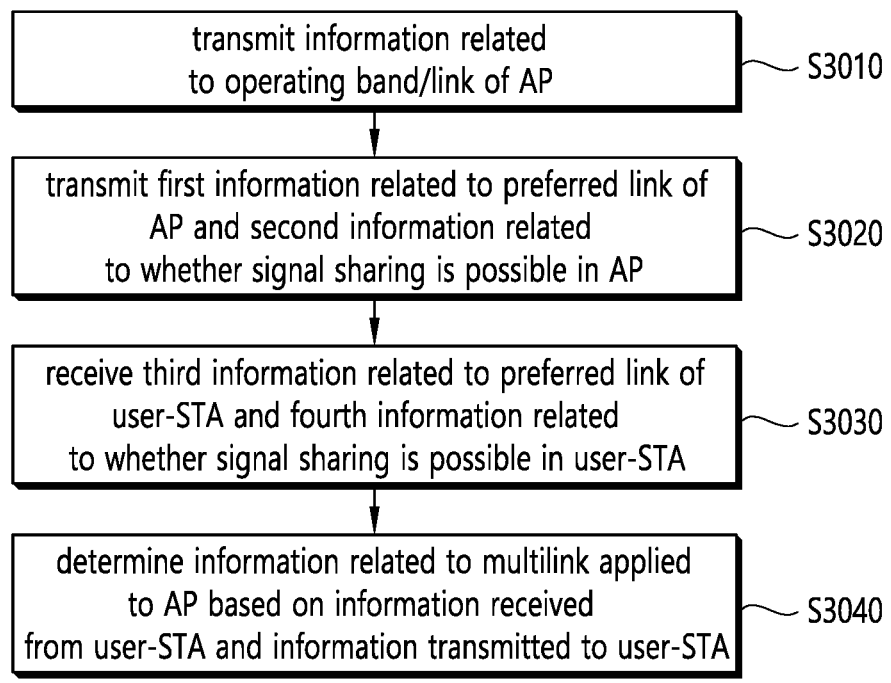
FIG. 30 is a flowchart of a procedure performed by an AP STA.

FIG. 30 is a flowchart of a procedure performed in an AP STA.

Each step illustrated in FIG. 30 illustrates a specific example of an operation performed by an AP STA, and the AP STA may perform only some of the operations of FIG. 30. Accordingly, not all the examples of FIG. 30 are essential operations and the AP STA may omit/modify some of the operations of FIG. 30.

As illustrated in step S3010, the AP STA may transmit information related to an operating band/link. The information related to the operating band/link may be information related to a 2.4/5/6 GHz band and a channel (20/40/80/160/240/320 MHz) included in the corresponding band. The information transmitted through step S3010 may include the technical features described in FIGS. 23 to 27 included in the first/second embodiment described above.

As illustrated in step S3020, the AP STA may transmit first information related to a preferred link of the AP and second information related to whether signal sharing is possible in the AP. The technical features of step S3020 may be the same as the technical features of step S2920 described above.

As illustrated in step S3030, the AP STA may receive third information related to the preferred link of the user-STA and fourth information related to whether signal sharing is possible in the AP. The technical features of step S3030 may be the same as the technical features of step S2930 described above.

As illustrated in step S3040, the AP STA may determine information related to multilink applied to the user-STA based on information received from the user-STA and information transmitted to the user-STA. That is, the AP may negotiate the information related to an operating band/link, a preferred band/link, and information related to band sharing capability with the user-STA and then perform communication with the user-STA based on a negotiation result.

Figure 31:
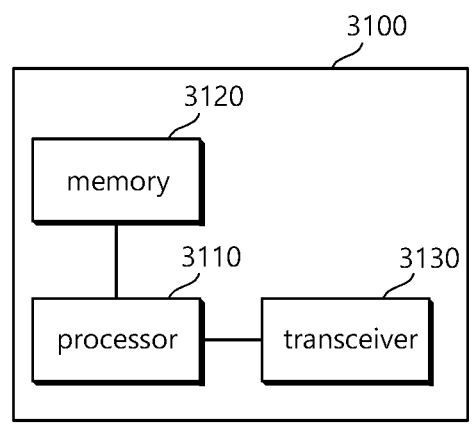
FIG. 31 illustrates a user-STA or AP to which an example of the present disclosure is applied.

FIG. 31 illustrates a user-STA or an AP to which an example of the present disclosure is applied.

An STA 3100 of FIG. 31 may be a user-STA or an AP.

Referring to FIG. 31, the STA 3100 may include a processor 3110, a memory 3120, and a transceiver 3130. The features of FIG. 31 may be applied to a non-AP STA or an AP STA. The illustrated processor, memory, and transceiver may be implemented as separate chips, or at least two or more blocks/functions may be implemented through a single chip.

The illustrated transceiver 3130 performs a signal transmission/reception operation. Specifically, the transceiver 3130 may transmit and receive IEEE 802.11 packets (e.g., IEEE 802.11a/b/g/n/ac/ax/be, etc.).

The processor 3110 may implement the functions, processes, and/or methods proposed in the present disclosure. Specifically, the processor 3110 may receive a signal through the transceiver 3130, process the received signal, generate a transmission signal, and perform control for signal transmission.

The processor 3110 may include an application-specific integrated circuit (ASIC), another chipset, a logic circuit, and a data processing device. The memory 3120 may include read-only memory (ROM), random access memory (RAM), flash memory, memory card, storage medium, and/or other storage device.

The memory 3120 may store a signal (i.e., a reception signal) received through the transceiver and may store a signal (i.e., a transmission signal) to be transmitted through the transceiver. That is, the processor 3110 may acquire the received signal through the memory 3120 and store the signal to be transmitted in the memory 3120.

Figure 32:
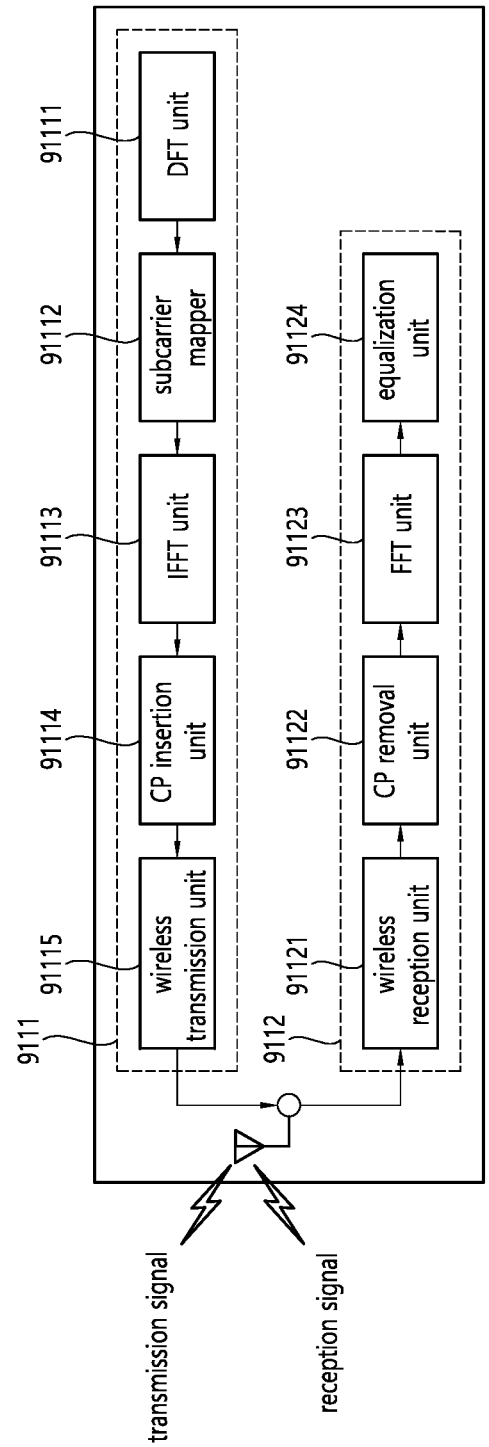
FIG. 32 illustrates another example of a detailed block diagram of a transceiver.

FIG. 32 illustrates another example of a detailed block diagram of a transceiver. Some or all blocks of FIG. 32 may be included in the processor 3110. Referring to FIG. 32, a transceiver may include a transmitting part 9111 and a receiving part 9112. The transmitting part 9111 includes a discrete Fourier transform (DFT) unit 91111, a subcarrier mapper 91112, an inverse fast Fourier transform (IFFT) unit

91113, a CP insertion unit 91114, and a wireless transmission unit 91115. The transmitting part 9111 may further include a modulator. In addition, for example, the transmitting part 9111 may further include a scramble unit (not shown), a modulation mapper (not shown), a layer mapper (not shown), and a layer permutator (not shown), and these components may be arranged before the DTF unit 91111. That is, in order to prevent an increase in a peak-to-average power ratio (PAPR), the transmitting part 9111 allows information to first go through the DFT unit 91111 before mapping a signal to a subcarrier. After a signal spread by the DFT unit 91111 (or precoded in the same sense) is mapped through the subcarrier mapper 91112, the mapped signal goes through the IFFT unit 91113 so as to be generated as a signal on a time axis.

The DFT unit 91111 performs DFT on input symbols and outputs complex-valued symbols. For example, when Ntx symbols are input (here, Ntx is a natural number), a DFT size is Ntx. The DFT unit 91111 may be referred to as a transform precoder. The subcarrier mapper 91112 maps the complex-valued symbols to each subcarrier in a frequency domain. The complex symbols may be mapped to resource elements corresponding to a resource block allocated for data transmission. The subcarrier mapper 91112 may be referred to as a resource element mapper. The IFFT unit 91113 performs IFFT on an input symbol and outputs a baseband signal for data as a time domain signal. The CP insertion unit 91114 copies a rear part of the base band signal for data and inserts it into a front part of the base band signal for data. Inter-symbol interference (ISI) and inter-carrier interference (ICI) may be prevented through CP insertion, so that orthogonality may be maintained even in a multipath channel.

Meanwhile, the receiving part 9112 includes a wireless reception unit 91121, a CP removal unit 91122, an FFT unit 91123, an equalization unit 91124, and the like. The wireless reception unit 91121, the CP removal unit 91122, and the FFT unit 91123 of the receiving part 9112 perform reverse functions of the wireless transmission unit 91115, the CP insertion unit 91114, and the IFFT unit 91113 of the transmitting part 9111. The receiving part 9112 may further include a demodulator.

In addition to the illustrated blocks, the transceiver of FIG. 21 may include a reception window controller (not shown) extracting a part of a received signal and a decoding operation processing unit (not shown) performing a decoding operation on a signal extracted through a reception window.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyperparameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

What is claimed is:

1. A method used in a wireless local area network (WLAN) system, the method comprising:
   receiving, by an Extremely High Throughput (EHT) station (STA) operating based on a multi-link operation related to a plurality of links including a first link and a second link, an association response frame comprising:
   a High Efficiency (HE) operation element related to an HE system,
   an EHT operation element related to an EHT system, and
   a multi-link control information related to the multi-link operation from a transmitting STA,
   wherein the HE operation element comprises a 6 GHz operation information field including a primary channel field indicating a channel number of a primary channel in a 6 GHz band,
   wherein the EHT operation element comprises a channel center frequency field indicating a channel center frequency of the primary channel,
   wherein the EHT operation element does not comprise the primary channel field, and
   wherein the multi-link control information comprises a first control frame including first information related to a link of the plurality of links and second information related to capability of the multi-link operation;
   determining, by the EHT STA, at least one operation element of the association response frame for the EHT STA based on an operating band of the EHT STA,
   wherein the EHT STA considers the HE operation element and the EHT operation element if the EHT STA operates in the 6 GHz band; and
   performing, by the EHT STA, the multi-link operation with the transmitting STA based on the multi-link control information.

2. The method of claim 1, wherein
   the first link and the second link are each included in a 2.4 GHz band, 5 GHz band, or 6 GHz band, and the first link and the second link are included in different bands.

3. The method of claim 1, wherein the HE operation element comprises control information to be used for an HE STA.

4. An Extremely High Throughput (EHT) station (STA) in a wireless local area network (WLAN) system, comprising:
   a transceiver configured to operate based on a multi-link operation related to a plurality of links including a first link and a second link; and
   a processor configured to control the transceiver,
   wherein the processor is further configured to:
   receive an association response frame comprising:
      a High Efficiency (HE) operation element related to an HE system,
      an EHT operation element related to an EHT system, and
      a multi-link control information related to the multi-link operation from a transmitting STA,
      wherein the HE operation element comprises a 6 GHz operation information field including a primary channel field indicating a channel number of a primary channel in a 6 GHz band,
      wherein the EHT operation element comprises a channel center frequency field indicating a channel center frequency of the primary channel,
      wherein the EHT operation element does not comprise the primary channel field,
      wherein the multi-link control information comprises a first control frame including first information related to a link of the plurality of links and second information related to capability of the multi-link operation;
   determine at least one operation element of the association response frame for the EHT STA based on an operating band of the EHT STA,
   wherein the EHT STA considers the HE operation element and the EHT operation element if the EHT STA operates in the 6 GHz band; and
   perform the multi-link operation with the transmitting STA based on the multi-link control information.

5. The EHT STA of claim 4, wherein
   the first link and the second link are each included in a 2.4 GHz band, 5 GHz band, or 6 GHz band, and the first link and the second link are included in different bands.

6. The EHT STA of claim 4, wherein the HE operation element comprises control information to be used for an HE STA.

7. A method used in a wireless local area network (WLAN) system, the method comprising:
   transmitting, to a receiving STA from an Extremely High Throughput (EHT) station (STA) operating based on a multi-link operation related to a plurality of links including a first link and a second link, an association response frame comprising:
   a High Efficiency (HE) operation element related to an HE system,
   an EHT operation element related to an EHT system, and
   a multi-link control information related to the multi-link operation,
   wherein the HE operation element comprises a 6 GHz operation information field including a primary channel field indicating a channel number of a primary channel in a 6 GHz band,
   wherein the EHT operation element comprises a channel center frequency field indicating a channel center frequency of the primary channel,
   wherein the EHT operation element does not comprise the primary channel field, and
   wherein the multi-link control information comprises a first control frame including first information related to a link of the plurality of links and second information related to capability of the multi-link operation;
   determining, by the EHT STA, at least one operation element of the association response frame for the EHT STA based on an operating band of the EHT STA,
   wherein the EHT STA considers the HE operation element and the EHT operation element if the EHT STA operates in the 6 GHz band; and
   performing, by the EHT STA, the multi-link operation with the receiving STA based on the multi-link control information.

8. The method of claim 7, wherein the HE operation element comprises control information to be used for an HE STA.

9. The method of claim 7, wherein the first link and the second link are each included in a 2.4 GHz band, 5 GHz band, or 6 GHz band, and the first link and the second link are included in different bands.

* * * * *